(12) United States Patent
Takeda et al.

(10) Patent No.: US 7,003,588 B1
(45) Date of Patent: Feb. 21, 2006

(54) PERIPHERAL DEVICES FOR A VIDEO GAME SYSTEM

(75) Inventors: Genyo Takeda, Kyoto (JP); Ko Shiota, Kyoto (JP); Munchito Oira, Kyoto (JP); Kazuo Koshima, Kyoto (JP); Satoshi Nishiumi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 10/225,488

(22) Filed: Aug. 22, 2002

Related U.S. Application Data

(60) Provisional application No. 60/313,812, filed on Aug. 22, 2001.

(51) Int. Cl.
*A63F 13/00* (2006.01)

(52) U.S. Cl. .............................. 710/8; 710/62; 710/72; 710/300; 463/46; 463/47

(58) Field of Classification Search ................ 710/100, 710/300–304, 305, 62, 72, 8–13; 463/30–47, 463/16
See application file for complete search history.

(56) References Cited

U.S. PATENT DOCUMENTS

| | | |
|---|---|---|
| 3,369,177 A | 2/1968 | Graham et al. |
| 4,167,019 A | 9/1979 | Shepperd ..................... 358/22 |
| 4,278,972 A | 7/1981 | Wozniak ..................... 340/703 |
| 4,296,476 A | 10/1981 | Mayer et al. ................ 364/900 |
| 4,324,401 A | 4/1982 | Stubben et al. ............... 273/85 |
| 4,388,620 A | 6/1983 | Sherman |
| 4,407,298 A | 10/1983 | Lentz et al. ................. 128/713 |
| 4,425,559 A | 1/1984 | Sherman |
| 4,454,594 A | 6/1984 | Heffron et al. ............. 364/900 |
| 4,462,076 A | 7/1984 | Smith, III ................... 364/200 |
| 4,562,308 A | 12/1985 | Kopetzky et al. ............. 179/18 |
| 4,567,516 A | 1/1986 | Scherer et al. .............. 358/114 |
| 4,570,233 A | 2/1986 | Yan et al. |
| 4,589,089 A | 5/1986 | Frederiksen ................ 364/900 |
| 4,592,012 A | 5/1986 | Braun ........................ 364/900 |
| 4,658,247 A | 4/1987 | Gharachorloo |
| 4,725,831 A | 2/1988 | Coleman |
| 4,799,635 A | 1/1989 | Nakagawa .................. 364/900 |
| 4,829,295 A | 5/1989 | Hiroyuki |
| 4,837,488 A | 6/1989 | Donahue ..................... 324/66 |
| 4,850,591 A | 7/1989 | Takezawa et al. ............ 273/85 |

(Continued)

FOREIGN PATENT DOCUMENTS

| | | |
|---|---|---|
| CA | 2070934 | 12/1993 |

(Continued)

OTHER PUBLICATIONS

"Pinouts for Various Connectors in Real Life (tm)", [online], retrieved from the Internet, http://repairfaq.ece.drexel.edu/REPAIR/F_Pinouts1.html, updated May 20, 1997 (per document).

(Continued)

*Primary Examiner*—Christopher Shin
(74) *Attorney, Agent, or Firm*—Nixon & Vanderhye, P.C.

(57) ABSTRACT

A peripheral device is provided for connection to a home video game system having a recess formed in an external surface thereof. The peripheral device includes an electrical component, an electrical connector coupled to the electrical component for connecting to a connector of the home video game system, and a housing. The housing of the peripheral device is configured so that when the peripheral device is inserted in the recess of the home video game system, it is substantially flush with the external surface of the home video game system. In this way, the footprint of the video game system can remain the same, even if peripheral devices are added.

10 Claims, 14 Drawing Sheets

U.S. PATENT DOCUMENTS

| | | | |
|---|---|---|---|
| 4,862,392 A | 8/1989 | Steiner | |
| 4,866,637 A | 9/1989 | Gonzalez-Lopez et al. | |
| 4,901,064 A | 2/1990 | Deering | |
| 4,914,729 A | 4/1990 | Omori et al. | |
| 4,945,500 A | 7/1990 | Deering | |
| 4,972,470 A | 11/1990 | Farago | 380/3 |
| 4,976,429 A | 12/1990 | Nagel | 273/1 |
| 5,004,232 A | 4/1991 | Wong et al. | 273/435 |
| 5,049,863 A | 9/1991 | Oka | 340/170 |
| 5,050,041 A | 9/1991 | Shafi | 361/391 |
| 5,091,832 A | 2/1992 | Tortola et al. | 362/109 |
| 5,136,664 A | 8/1992 | Bersack et al. | |
| 5,155,768 A | 10/1992 | Matsuhara | 380/23 |
| 5,170,468 A | 12/1992 | Shah et al. | |
| RE34,161 E | 1/1993 | Nakagawa et al. | 273/85 |
| 5,213,327 A | 5/1993 | Kitaue | 273/148 |
| 5,230,059 A | 7/1993 | Nielsen et al. | 395/800 |
| 5,239,540 A | 8/1993 | Rovira et al. | 370/77 |
| 5,245,320 A | 9/1993 | Bouton | 345/167 |
| 5,268,669 A | 12/1993 | Roskowski | 340/534 |
| 5,389,006 A | 2/1995 | Noschese | 439/354 |
| 5,392,385 A | 2/1995 | Evangelisti et al. | |
| 5,392,393 A | 2/1995 | Deering | |
| 5,421,028 A | 5/1995 | Swanson | |
| 5,421,590 A | 6/1995 | Robbins | 273/438 |
| 5,428,355 A | 6/1995 | Jondrow et al. | 341/20 |
| 5,457,775 A | 10/1995 | Johnson, Jr. et al. | |
| 5,459,487 A | 10/1995 | Bouton | 345/156 |
| 5,504,917 A | 4/1996 | Austin | |
| 5,509,811 A | 4/1996 | Homic | 439/55 |
| 5,513,302 A | 4/1996 | Tsai | 395/114 |
| 5,546,050 A | 8/1996 | Florian et al. | 330/282 |
| 5,556,108 A * | 9/1996 | Nagano et al. | 463/45 |
| 5,593,350 A | 1/1997 | Bouton et al. | 463/36 |
| 5,594,854 A | 1/1997 | Baldwin et al. | |
| 5,599,231 A | 2/1997 | Hibino et al. | 463/29 |
| 5,599,232 A | 2/1997 | Darling | 463/44 |
| 5,607,157 A | 3/1997 | Nagashima | 273/148 |
| 5,608,424 A | 3/1997 | Takahashi et al. | |
| 5,615,344 A | 3/1997 | Corder | 395/309 |
| 5,624,316 A * | 4/1997 | Roskowski et al. | 463/45 |
| 5,628,686 A | 5/1997 | Svancarek et al. | 463/36 |
| 5,630,170 A | 5/1997 | Koizumi et al. | 395/834 |
| 5,630,174 A | 5/1997 | Stone, III et al. | 395/883 |
| 5,644,790 A | 7/1997 | Li et al. | 395/883 |
| 5,645,277 A | 7/1997 | Cheng | 273/148 |
| 5,655,966 A | 8/1997 | Werdin, Jr. et al. | 463/25 |
| 5,680,534 A | 10/1997 | Yamato et al. | 395/173 |
| 5,687,357 A | 11/1997 | Priem | |
| 5,696,912 A | 12/1997 | Bicevskis et al. | 395/308 |
| 5,701,444 A | 12/1997 | Baldwin | |
| 5,708,799 A | 1/1998 | Gafken et al. | 395/500 |
| 5,717,428 A | 2/1998 | Barrus et al. | 345/168 |
| 5,721,947 A | 2/1998 | Priem et al. | 395/824 |
| 5,727,192 A | 3/1998 | Baldwin | |
| 5,748,756 A | 5/1998 | Leal et al. | 381/118 |
| 5,754,890 A | 5/1998 | Holmdahl et al. | 395/883 |
| 5,758,182 A | 5/1998 | Rosenthal et al. | |
| 5,759,104 A * | 6/1998 | Shirae et al. | 463/45 |
| 5,761,447 A * | 6/1998 | Knox et al. | 710/303 |
| 5,764,243 A | 6/1998 | Baldwin | |
| 5,768,626 A | 6/1998 | Munson et al. | |
| 5,768,629 A | 6/1998 | Wise et al. | |
| 5,774,133 A | 6/1998 | Neave et al. | |
| 5,775,997 A * | 7/1998 | Veatch | 463/46 |
| 5,777,629 A | 7/1998 | Baldwin | |
| 5,784,064 A | 7/1998 | Penna et al. | 345/422 |
| 5,798,770 A | 8/1998 | Baldwin | |
| 5,801,706 A | 9/1998 | Fujita et al. | |
| 5,801,716 A | 9/1998 | Silverbrook | |
| 5,805,868 A | 9/1998 | Murphy | |
| 5,815,166 A | 9/1998 | Baldwin | |
| 5,816,921 A | 10/1998 | Hosokawa | 463/43 |
| 5,821,949 A | 10/1998 | Deering | |
| 5,832,244 A | 11/1998 | Jolley et al. | 395/309 |
| 5,867,166 A | 2/1999 | Myhrvold et al. | 345/419 |
| 5,870,027 A | 2/1999 | Ho | 340/693 |
| 5,872,999 A | 2/1999 | Koizumi et al. | 395/892 |
| 5,874,969 A | 2/1999 | Storm et al. | |
| 5,886,686 A | 3/1999 | Chen | 345/168 |
| 5,892,974 A | 4/1999 | Koizumi et al. | 395/836 |
| 5,917,496 A | 6/1999 | Fujita et al. | |
| 5,920,326 A | 7/1999 | Rentschler et al. | |
| 5,935,224 A | 8/1999 | Svancarek et al. | 710/63 |
| 5,940,086 A | 8/1999 | Rentschler et al. | |
| 5,949,424 A | 9/1999 | Cabral et al. | |
| 5,949,440 A | 9/1999 | Krech, Jr. et al. | |
| 5,949,643 A * | 9/1999 | Batio | 361/681 |
| 5,969,726 A | 10/1999 | Rentschler et al. | |
| 5,991,546 A | 11/1999 | Chan et al. | 395/882 |
| 5,996,033 A | 11/1999 | Chiu-Hao | 710/68 |
| 5,999,196 A | 12/1999 | Storm et al. | |
| 6,002,409 A | 12/1999 | Harkin | |
| 6,006,295 A | 12/1999 | Jones et al. | 710/62 |
| 6,018,765 A | 1/2000 | Durana et al. | 709/217 |
| 6,023,738 A | 2/2000 | Priem et al. | |
| 6,025,853 A | 2/2000 | Baldwin | |
| 6,028,611 A | 2/2000 | Anderson et al. | |
| 6,033,309 A | 3/2000 | Couch et al. | 463/38 |
| 6,035,356 A * | 3/2000 | Khan et al. | 710/301 |
| 6,037,949 A | 3/2000 | DeRose et al. | |
| 6,057,852 A | 5/2000 | Krech, Jr. | |
| 6,067,411 A | 5/2000 | Poimboeuf et al. | 395/551 |
| 6,071,191 A | 6/2000 | Takeda et al. | 463/29 |
| 6,076,119 A | 6/2000 | Maemura et al. | 710/15 |
| 6,092,124 A | 7/2000 | Priem et al. | |
| 6,098,130 A | 8/2000 | Wang | 710/100 |
| 6,101,560 A | 8/2000 | Gulick | 710/62 |
| 6,131,134 A | 10/2000 | Huang et al. | 710/103 |
| 6,147,673 A | 11/2000 | Zarek | 345/156 |
| 6,166,748 A | 12/2000 | Van Hook et al. | 345/522 |
| 6,171,190 B1 | 1/2001 | Thanasack et al. | 463/51 |
| 6,173,367 B1 | 1/2001 | Aleksic et al. | |
| 6,181,352 B1 | 1/2001 | Kirk et al. | |
| 6,190,257 B1 | 2/2001 | Takeda et al. | 463/29 |
| 6,193,609 B1 | 2/2001 | D'Achard | 463/37 |
| 6,198,488 B1 | 3/2001 | Lindholm et al. | |
| 6,200,253 B1 | 3/2001 | Nishiumi et al. | 563/47 |
| 6,213,878 B1 | 4/2001 | Setsumasa et al. | 463/31 |
| 6,217,351 B1 | 4/2001 | Fung et al. | 439/131 |
| 6,226,012 B1 | 5/2001 | Priem et al. | |
| 6,230,232 B1 | 5/2001 | Nishiumi et al. | 711/4 |
| 6,238,291 B1 | 5/2001 | Fujimoto et al. | 463/44 |
| 6,247,075 B1 | 6/2001 | Wang et al. | 710/63 |
| 6,263,392 B1 | 7/2001 | McCauley | 710/129 |
| 6,264,558 B1 | 7/2001 | Nishiumi et al. | 463/36 |
| 6,279,906 B1 | 8/2001 | Sanderson et al. | 273/148 |
| 6,307,880 B1 | 10/2001 | Evans et al. | 375/222 |
| 6,334,160 B1 | 12/2001 | Emmert et al. | 710/11 |
| 6,386,980 B1 * | 5/2002 | Nishino et al. | 463/43 |
| 6,496,884 B1 * | 12/2002 | Friesen | 710/100 |
| 6,599,194 B1 * | 7/2003 | Smith et al. | 463/30 |
| 6,609,977 B1 * | 8/2003 | Shimizu et al. | 463/36 |
| 6,615,301 B1 | 9/2003 | Lee et al. | 710/106 |
| 2001/0006391 A1 | 7/2001 | Sawano et al. | 345/418 |
| 2001/0008847 A1 | 7/2001 | Miyamoto et al. | 463/33 |

FOREIGN PATENT DOCUMENTS

| | | |
|---|---|---|
| EP | 0780771 A2 | 6/1997 |
| EP | 1 074 945 | 2/2001 |
| EP | 1 075 146 | 2/2001 |
| EP | 1 081 649 | 3/2001 |
| JP | 11053580 | 2/1999 |

| | | |
|---|---|---|
| JP | 11076614 | 3/1999 |
| JP | 11161819 | 6/1999 |
| JP | 11203500 | 7/1999 |
| JP | 11226257 | 8/1999 |
| JP | 11259671 | 9/1999 |
| JP | 11259678 | 9/1999 |
| JP | 2000-66985 | 3/2000 |
| JP | 2000-92390 | 3/2000 |
| JP | 2000-132704 | 5/2000 |
| JP | 2000-132706 | 5/2000 |
| JP | 2000-149053 | 5/2000 |
| JP | 2000-156875 | 6/2000 |
| JP | 2000-182077 | 6/2000 |
| JP | 2000-207582 | 7/2000 |
| JP | 2000-215325 | 8/2000 |
| WO | 8809573 A1 | 6/1990 |
| WO | WO 94/10641 | 5/1994 |

OTHER PUBLICATIONS

"Pinouts for Various Connectors in Real Life (tm)", [online], retrieved from the Internet, http://repairfaq.ece.drexel.edu/REPAIR/F_Pinouts2.html, updated May 20, 1997 (per document).

"Pinouts for Various Connectors in Real Life (tm)", [online], retrieved from the Internet, http://repairfaq.ece.drexel.edu/REPAIR/F_Pinouts3.html, updated May 20, 1997 (per document).

Tilton, Jay; "Nintendo NES and SNES controllers", Deathskull Laboratories!, Jun. 28. 1998 (per document), [online], retrieved from the Internet, http://users.erols.com/tilton/games/tech/nescont.html.

*68HC705V8 Specification Rev. 2.1 (General Release)*, MCU System Design Group, Oak Hill, Texas, Aug. 12, 1994, pp. iii-xi, xiii, and 89-96.

*HC08—68HC08AS32, Advance Information Rev. 3.0*, Motorola, printed out Jul. 24, 2001, pp. 2-27, and 234-308.

Website http://www.repairfaq.org/REPAIR/F_Pinouts.html entitled "Pinouts for various conectors in Real Life(tm)", p. 1 of 3, dated May 20, 1997, author not established.

Christy J., Website http://www.repairfaq.org/REPAIR/F_SNES.html entitled "Super Nintendo Entertainment System: pinouts & protocol, Mar. 26, 1996, 5 pages by way of link "2.2) SNES" in the website above.

Photograph of Sony PlayStation II System.

Photograph of Sega Dreamcast System.

Photograph of Nintendo 64 System.

Whitepaper: 3D Graphics Demystified, Nov. 11, 1999, www.nvidia.com.

Whitepaper: "Z Buffering, Interpolation and More W-Buffering", Doug Rogers, Jan. 31, 2000, www.nvidia.com.

Whitepaper: Using GL_NV_vertex_array and GL_NV_fence, posted Aug. 1, 2000, www.nvidia.com.

Whitepaper: Anisotropic Texture Filtering in OpenGL, posted Jul. 17, 2000, www.nvidia.com.

Whitepaper: Mapping Texels to Pixels in D3D, posted Apr. 5, 2000, www.nvidia.com.

Whitepaper: Guard Band Clipping, poted Jan. 31, 2000, www.nvidia.com.

Whitepaper: Cube Environment Mapping, posted Jan. 14, 2000, www.nvidia.com.

Whitepaper: Color Key in D3D, posted Jan 11, 2000, www.nvidia.com.

Whitepaper: Vertex Blending Under DX7 for the GeForce 256, Jan. 5, 2000, www.nvidia.com.

Whitepaper: Optimizing Direct3D for the GeForce 256, Jan. 3, 2000, www.nvidia.com.

Whitepaper: Dot Product Texture Blending, Dec. 3, 1999, www.nvidia.com.

Whitepaper: Technical Brief: AGF 4X with Fast Writes, Nov. 10, 1999, www.nvidia.com.

Whitepaper: Transform and Lighting, Nov. 10, 1999, www.nvidia.com.

Technical Brief: What's New With Microsoft DirectX7, posted Nov. 10, 1999, www.nvidia.com.

Mitchell et al., "Multitexturing in DirectX6", Game Developer, Sep. 1998, www.gdmag.com.

VisionTek, "GeForce2 GS Graphics Processing Unit", ©2000 www.visiontek.com.

Jim Bushnell et al. "Advanced Multitexture Effects With Direct3D and OpenGL", Pyramid Peak Design & ATI Research, Inc., GameDevelopers Conference, ©1999.

Sony PlayStation II Instruction Manual, Sony Computer Entertainment Inc., ©2000.

Stand and Be Judged, Next Generation, May 2000.

PlayStation II: Hardware Heaven or Hell?, Next Generation, Jan. 2000.

Chris Charla, "Play Station II: The Latest News", Next Generation, Sep. 1999.

"First Playstation II Gameplay Screens Revealed!", Next Generation, Sep. 1999.

Game Enthusiast Online Highlights, Mar. 18, 1999.

Game Enthusiast Online Highlights, Mar. 19, 1999.

Game Enthusiast Online Highlights, Mar. 17, 1999.

Game Enthusiast Online Highlights, Oct. 20, 1999.

Joel Easley, "PlayStation II Revealed", Game Week, Sep. 29, 1999.

Inside Sony's Next Generation Playstation, ©1999.

Press Releases, Mar. 18, 1999.

Chris Johnston, "PlayStation Part Deux", Press Start, ©1999.

Nikkei Shimbun, "Sony Making SME, Chemical and SPT into Wholly-Owned Subsidiaries", Mar 9, 1999.

AM News: Japanese Developers Not All Sold on PS2, Next Generation, Mar. 16, 1999.

Sony To Turn PlayStation Maker Into Wholly Owned Unit-Nikkei, Dow Johnes News Service, Mar. 8, 1999.

Yumiko Ono, Sony Antes Up Its Chips In Bet On New Game System, Dow Jones News Service, Mar. 4, 1999.

MacWeek.Com Gets Inside Story on Connectix VGS for Windows; Controversial Emulator of Sony PlayStation Games Cureently Available for Macs Only, Business Wire, Mar. 12, 1999.

"DexDrive Bridges Gap", The Tampa Tribune, Mar. 12, 1999.

A Microprocessor With a 128b CPU, 10 Floating-Point MAC's, 4 Floating-Point Dividers, and an MPEG2 Decoder, 1999 IEEE International Solid-State Circuits Conference, Feb. 16, 1999.

Dreamcast Instruction Manual, Sega Enterprises, Ltd., ©1998.

"Sega To Launch Video Camera for Dreamcast", Reuters Business News, Feb. 16, 2000.

David Pescovitz, "Dream On", Wired, Aug. 1999.

Randy Nelson, "Dreamcast 101: Everything You Ever Wanted To Know About Sega's Powerful New Console", Official Sega Dreamcast Magazine, Jun. 1999.

2D/3D Graphics Card User Manual, Guillemot ©1999.

Nintendo 64 Instruction Booklet, Nintendo of America, 1998.

Steven Levy, "Here Comes PlayStation II", Newsweek, Mar. 6, 2000.

David Sheff, "Sony Smackage: Test Driving The PlayStation II", Wired, Nov. 1999.

Introducing The Next Generation PlayStation, Sony Computer Entertainment Inc., ©1999.

Lead GTS, Aug. 3, 2000, www.hexus.net.

Voodoo 5 5500 Review, Jul. 26, 2000, www.hexus.net.

ATI Radeon 64 Meg DDR OEM, Aug., 19, 2000, www.hexus.net.

Microsoft Xbox—The Future of Gaming, Microsoft Xbox Performance Sheet, www.xbox.com.

Robert L. Cook, "Shade Trees", Computer Graphics, vol. 18, No. 3, Jul. 1984.

Wang et al., "Second-Depth Shadow Mapping", Department of Computer Science, Univ. N.C, Chapel Hill, N.C. pp. 1-7.

Peercy et al., "Efficient Bump Mapping Hardware", Computer Graphics Proceedings, Annual Conference Series, 1997.

Gustavo Oliveira, "Refractive Texture Mappig, Part One", www.gamasutra.com, Nov., 10, 2000.

John Schlag, Fast Embossing Effects on Raster Image Data, Graphics Gems IV, Edited by Paul S. Heckbert, Computer Science Department, Carnegie Mellon University, Academic Press, Inc., 1994,pp. 433-437.

James F. Blinn, "Simulationof Wrinkled Surfaces," Caltech/JPL, pp. 286-292, SIGGRAPH 78 (1978).

Tomas Möller and Eric Haines "Real-Time Rendering", AK Peters, Ltd., ©1999, pp. 127-142.

Technical Presentation: Vertex Buffers, posted Jun. 12, 2000, www.nvidia.com.

Technical Presentation: Hardware Transform and Lighting, www.nvidia.com, posted Jun. 12, 2000.

Technical Presentation: Hardware Bump-mapping Choices and Concepts, Jun. 7, 2000, www.nvidia.com.

Technical Presentation: How to Bump Map a Skinned Polygonal Model, Jun. 7, 2000, www.nvidia.com.

Technical Presentation: Computations for Hardware Lighting and Shading, Mar. 17, 2000, www.nvidia.com.

Technical Presentation: Practical Bump-mapping for Today's GPUs, Mar. 17, 2000 www.nvidia.com.

Technical Presentation: Shadows, Transparency, & Fog, Mar. 17, 2000 www.nvidia.com.

Technical Presentation: GeForce 256 Register Combiners, Mar. 17, 2000,www.nvidia.com.

Technical Presentation: TexGen & The Texture Matrix, Mar. 15, 2000 www.nvidia.com.

Technical Presentation: Toon Shading, Mar. 15, 2000, www.nvidia.com.

Technical Presentation: D3D 7 Vertex Lighting, Mar. 15, 2000, www.nvidia.com.

Technical Presentation: Per-Pixel Lighting (by S. Dietrich) Mar. 14, 2000 www.nvidia.com.

Technical Presentation: GeForce 256 and RIVA TNT Combiners, Dec. 8, 1999, www.nvidia.com.

Technical Presentation: Vertex Cache Optimization, Nov. 12, 1999, www.nvidia.com.

Technical Presentation: Vertex Blending, Nov. 12, 1999, www.nvidia.com.

Technical Presentation: Hardware Transform and Lighting, Nov. 12, 1999, www.nvidia.com.

Technical Presentation: GeForce 256 Overview, Nov. 12, 1999, www.nvidia.com.

Technical Presentation: DirectX 7 and Texture Management, Nov. 12, 1999 www.nvidia.com.

Technical Presentation: Dot Product Lighting, Nov. 12, 1999, www.nvidia.com.

Technical Presentation: Texture Coordinate Generation, Nov. 3, 1999, www.nvidia.com.

Technical Presentation: Phong Shading and Lightmaps, Nov. 3, 1999, www.nvidia.com.

Technical Presentation: The ARB_multitexture Extension, Nov. 3, 1999 www.nvidia.com.

Technical Presentation: Multitexture Combiners, Nov. 3, 1999, www.nvidia.com.

Technical Presentation: Emboss Bump Mapping, Nov. 3, 1999, www.nvidia.com.

Technical Presentation: Hardware Accelerated Anisotropic Lighting, Nov. 3, 1999 www.nvidia.com.

Technical Presentation: Guard Band Clipping, Nov. 3, 1999, www.nvidia.com.

The RenderMan Interface, Stephan R. Keith, Version 3.1, Pixar Animation Studios, Sep. 1989.

The RenderMan Interface, Version 3.2, Pixar Animation Studios, Jul. 2000, www.pixar.com.

NVIDIA Product Overview, "GeForce2Ultra", NVIDIA Corporation, Aug. 21, 2000, www.nvidia.com.

Duke, "Dreamcast Technical Specs", Sega Dreamcast Review, Sega, Feb. 1999, www.game-revolution.com.

Marlin Rowley, "GeForce 1 & 2 GPU Speed Tests", May 11, 2000, www.g256.com.

"Dreamcast: The Full Story", Next Generation, Sep. 1998.

DirectX 7.0 Programmer's Reference, Microsoft Corporation,1995-1999 (as part of the DirectX 7.0 SDK on the Companion CD included with "Inside Direct3D", Microsoft Programming Series, Peter J. Kovach, Microsoft Press, 1999).

"Inside Direct3D", Microsoft Programming Series, Peter J. Kovach, Microsoft Press, 1999.

"OpenGL Programming Guide, The Official Guide to Learning OpenGL, Release 1", Jackie Nieder, Tom David, Mason Woo, Addison-Wesley Publishing Co., 1993.

"Procedural Elements for Computer Graphics," Second Edition, David F. Rogers, McGraw Hill, 1998.

"Real-Time Rendering," Tomas Molleir, Eric Haines, AK Peters, 1999.

"Computer Graphics, Principles and Practices," Second Edition, The Systems Programming Series, Foley, van Dam, Fiener, Hughes, Addison Wesley, 1990.

"Priciples of Three-Dimensional Computer Animation", Revised Edition, Michael O'Rourke, W.W. Norton & Company, 1998.

U.S. Appl. No. 10/132,702.
U.S. Appl. No. 10/225,472.
U.S. Appl. No. 10/225,487.
U.S. Appl. No. 10/600,585.

* cited by examiner

Fig. 5   EXAMPLE GRAPHICS PROCESSOR FLOW

Fig. 6  EXAMPLE INPUT/OUTPUT SUBSYSTEM

PERIPHERAL DEVICES FOR A VIDEO GAME SYSTEM

CROSS-REFERENCE TO RELATED APPLICATION

This application claims priority under 35 U.S.C. 119 to provisional Application No. 60/313,812, filed Aug. 22, 2001, the contents of which are incorporated herein.

FIELD OF THE INVENTION

The present invention relates to computer graphics, and more particularly to interactive graphics systems such as home video game systems. Still more particularly, this invention relates to peripheral devices for connection to a home video game system.

BACKGROUND AND SUMMARY OF THE INVENTION

Many of us have seen films containing remarkably realistic dinosaurs, aliens, animated toys and other fanciful creatures. Such animations are made possible by computer graphics. Using such techniques, a computer graphics artist can specify how each object should look and how it should change in appearance over time, and a computer then models the objects and displays them on a display such as your television or a computer screen. The computer takes care of performing the many tasks required to make sure that each part of the displayed image is colored and shaped just right based on the position and orientation of each object in a scene, the direction in which light seems to strike each object, the surface texture of each object, and other factors.

Because computer graphics generation is complex, computer-generated three-dimensional graphics just a few years ago were mostly limited to expensive specialized flight simulators, high-end graphics workstations and supercomputers. The public saw some of the images generated by these computer systems in movies and expensive television advertisements, but most of us couldn't actually interact with the computers doing the graphics generation. All this has changed with the availability of relatively inexpensive 3D graphics systems such as, for example, the Nintendo 64® and various 3D graphics cards now available for personal computers. It is now possible to interact with exciting 3D animations and simulations on relatively inexpensive computer graphics systems in your home or office.

A problem graphics system designers confronted in the past was how to efficiently couple system components together. A modern 3D graphics system is relatively complex, and requires a number of different connections between different aspects of the system. For example, it is often necessary to interface with a mass storage device such as an optical disk. In addition, in an interactive real time system such as a gaming system, some means must be provided to interface with user-manipulable controls such as hand-held controllers or the like. Sound is typically required, so that interfaces with various sound-producing and sound-supporting components are required. It is also necessary to provide some interfacing means for interfacing the system with a display device of an appropriate configuration. Additionally, it is often desirable to interface the system with a number of other components such as, for example, read only memory, flash memory, various memory cards, modems or other network connections, and debugging facilities for game or other application development. Various solutions to this problem were offered.

One approach would be to use standardized interfaces. Computer equipment manufacturers have developed a number of standardized interfaces in the past to connect with mass storage devices, modems, and other peripheral devices. Using standardized interfaces tends to simplify design efforts and achieve component compatibility and interoperability. The typical personal computer has a number of standardized interfaces so it can be modular and compatible with hardware and peripheral devices designed by a number of different manufacturers. Designing a new personal computer does not require redesign of all of these interfaces.

While the standardized interface approach has certain advantages in the arena of general purpose computing, it may not be suitable for home video game systems. Because a home video game system must be manufactured at low cost and yet achieve maximum performance, it is desirable to optimize each and every aspect of the system —including the system interfaces. The interfaces can be looked at as the highways over which information flows throughout the system. This information traffic should flow as rapidly and efficiently as possible. Using standard interfaces may be easier from a design standpoint, but a standardized interface may not provide the high performance that a customized interface might offer. "One size fits all" makes things easier, but doesn't always result in the best possible fit.

Another issue relates to hardware interoperability. Standardized interfaces provide the advantage that everyone can design components that are compatible with them. For example, when you buy a personal computer having a standardized serial interface, parallel interface and expansion device interface, you know that you can go out and purchase any of a variety of different devices all of which will be compatible with those standardized interfaces. You can plug in any of a dozen different types of printers to either the serial or the parallel interface of your personal computer, and they will all work. Similarly, any of dozens of different modems or other network cards can be plugged into the PCMCIA card slot of a personal computer or laptop, and all of these different cards will work.

Open standards have the advantage that they achieve hardware interoperability between systems and a wide range of different accessories. This approach is helpful when the system manufacturer is selling a general purpose device that can be used for virtually any application, but makes less sense in the home video game arena where a given video game manufacturer is responsible for making or licensing all of the various special-purpose accessories for its brand of home video game system.

For example, video game manufacturers in the past have expended substantial time, effort and resources to develop definitive new home video game systems. They want to sell as many of these as possible, and therefore price them very competitively. Like the razor manufacturer who recoups his investment by selling razor blades as opposed to the razor itself, video game system manufacturers rely on controlling access to the installed user base of home video game systems to achieve profits through licensing. If the home video game system used open standards, then competing manufacturers could bypass the company that invested all the time, effort and resources to develop the system to begin with, and could instead market directly to consumers. Accordingly, under this business model, it is important for the system manufacturer to be able to control access to the system.

One technique used successfully in the past to control access to home video game systems was to incorporate security systems that control access to the system. A security system can enable the system to accept or reject things plugged into it. As one example, it is possible to include an integrated circuit chip authentication type device in home video game cartridges. Before the home video game system interoperates with the cartridge or other peripheral device, it may first authenticate the cartridge or other peripheral device by use of the security chip. While this approach can be highly successful, it requires each peripheral device to include authentication type information and/or devices. This increases cost. In addition, no security system is impenetrable. Given enough time, effort and resources, any security system can be "cracked" to unlock access to the system. Thus, further improvements are desirable.

In addition, video game systems typically compete for space atop or around televisions with other electronic components such as video cassette recorders, DVD players, set-top boxes for cable and satellite systems and the like. This "competition" can be exacerbated if peripheral devices are to be added on to the video game system. Accordingly, it would be desirable to provide a video game system that provides a relatively small footprint even when peripheral devices are added to the system.

The present application describes a home video game system having at least one surface provided with one or more recesses therein. The video game system also has a connector within the recess for connecting peripheral devices inserted in the recess to the game processing circuitry. The peripheral device includes an electrical component, an electrical connector coupled to the electrical component for connecting to a connector of the home video game system, and a housing. The housing of the peripheral device is configured so that when the peripheral device is inserted in the recess of the home video game system, it is substantially flush with the external surface of the home video game system. In this way, the footprint of the video game system can remain the same, even if peripheral devices are added. In addition, because the shapes of the peripheral devices are non-standard and unusual, they provide uniqueness that can be used as a basis for excluding unlicensed and unauthorized people from manufacturing components that are compatible with the video game system. This allows a home video game system developer to protect its substantial investment in the development of the system.

BRIEF DESCRIPTION OF THE DRAWINGS

These and other features and advantages provided by the invention will be better and more completely understood by referring to the following detailed description of presently preferred embodiments in conjunction with the drawings, of which.

DETAILED DESCRIPTION OF EXAMPLE EMBODIMENTS OF THE INVENTION

Figure 1:
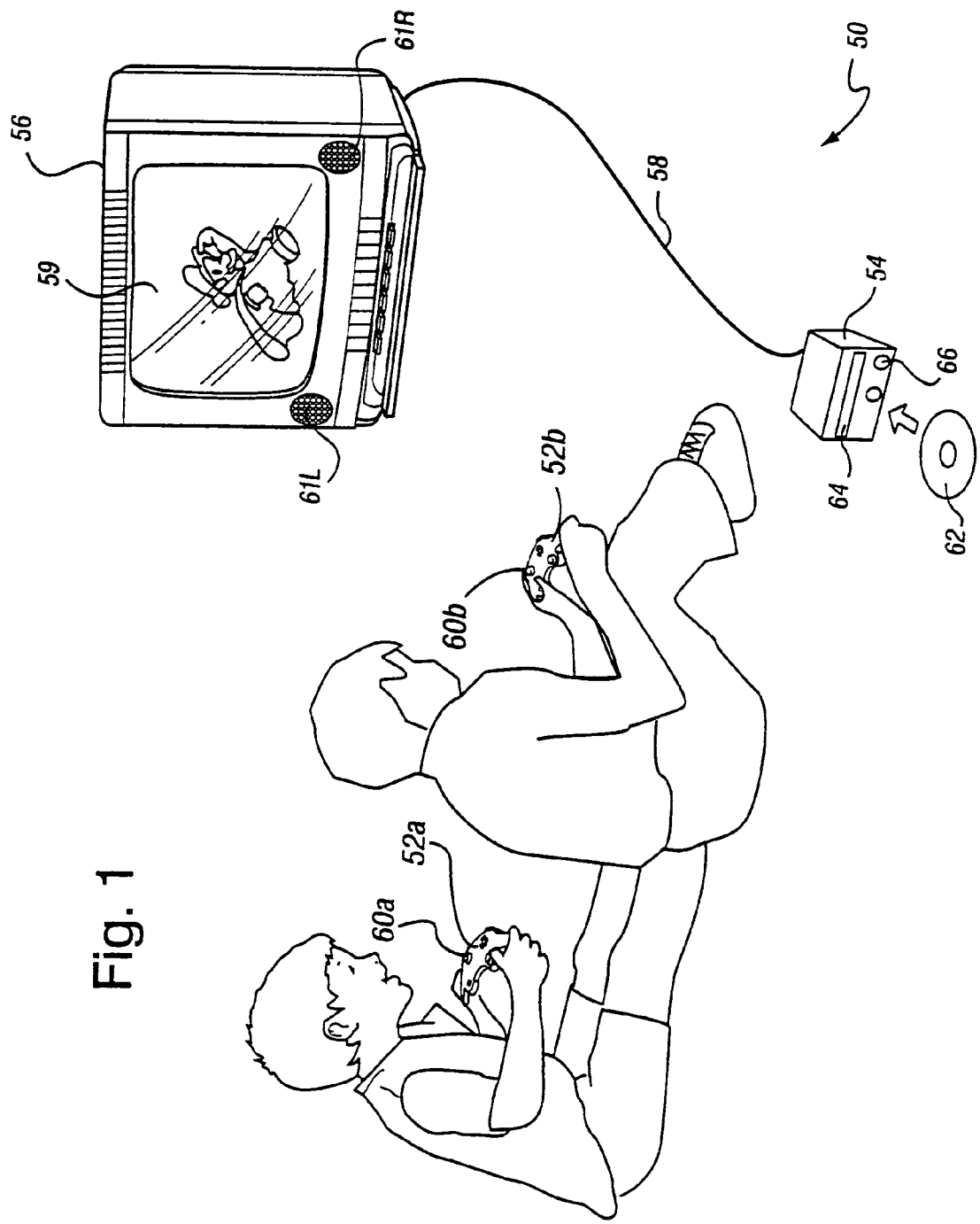
FIG. 1 is an overall view of an example interactive computer graphics system.

FIG. 1 shows an example interactive 3D computer graphics system 50. System 50 can be used to play interactive 3D video games with interesting stereo sound. It can also be used for a variety of other applications.

In this example, system 50 is capable of processing, interactively in real time, a digital representation or model of a three-dimensional world. System 50 can display some or all of the world from any arbitrary viewpoint. For example, system 50 can interactively change the viewpoint in response to real time inputs from handheld controllers 52*a*, 52*b* or other input devices. This allows the game player to see the world through the eyes of someone within or outside of the world. System 50 can be used for applications that do not require real time 3D interactive display (e.g., 2D display generation and/or non-interactive display), but the capability of displaying quality 3D images very quickly can be used to create very realistic and exciting game play or other graphical interactions.

To play a video game or other application using system 50, the user first connects a main unit 54 to his or her color television set 56 or other display device by connecting a cable 58 between the two. Main unit 54 produces both video signals and audio signals for controlling color television set 56. The video signals are what controls the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52*a*, 52*b* to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 (or other storage medium receiving means such as a tray) in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

Example Electronics of Overall System

Figure 2:
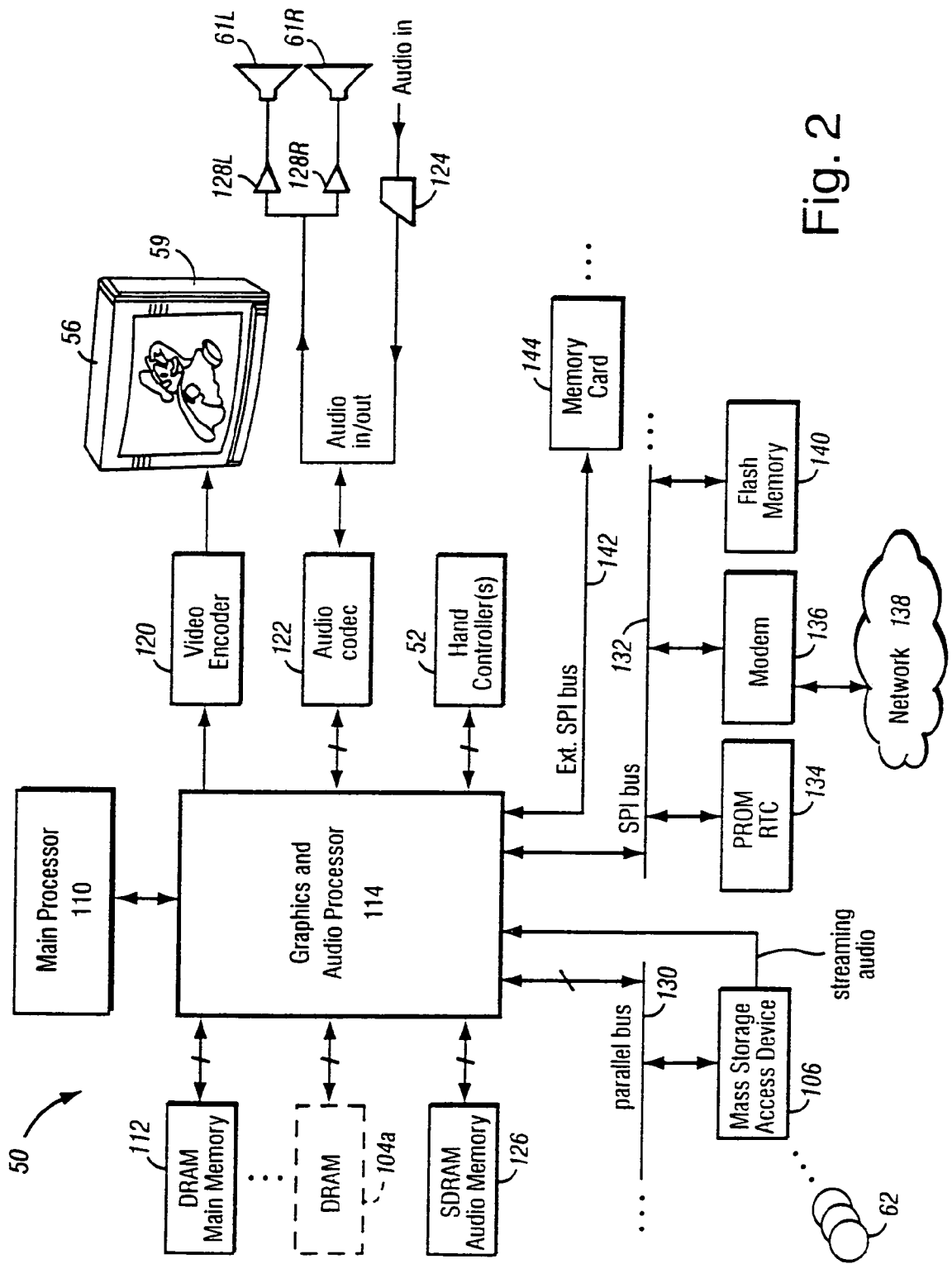
FIG. 2 is a block diagram of the FIG. 1 example computer graphics system.

FIG. 2 shows a block diagram of example components of system 50. The primary components include:
- a main processor (CPU) 110,
- a main memory 112, and
- a graphics and audio processor 114.

In this example, main processor 110 (e.g., an enhanced IBM Power PC 750) receives inputs from handheld controllers 52 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 110 can perform collision detection and animation processing in addition to a variety of interactive and control functions.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices.

Example system 50 includes a video encoder 120 that receives image signals from graphics and audio processor 114 and converts the image signals into analog and/or digital video display signals suitable for display on a standard display device such as a computer monitor or home color television set 56. System 50 also includes an audio codec (compressor/decompressor) 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an SDRAM audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61L, 61R of the television.

Graphics and audio processor 114 has the ability to communicate with various additional devices that may be present within system 50. For example, a parallel digital bus 130 may be used to communicate with mass storage access device 106 and/or other components. A serial peripheral bus 132 may communicate with a variety of peripheral or other devices including, for example:
- a programmable read-only memory (PROM) and/or real time clock (RTC) 134,
- a modem 136 or other networking interface such as a broadband adapter (which may in turn connect system 50 to a telecommunications network 138 such as the Internet or other digital network from/to which program instructions and/or data can be downloaded or uploaded), and
- flash memory 140.

A further external serial bus 142 may be used to communicate with additional expansion memory 144 (e.g., a memory card) or other devices. Connectors may be used to connect various devices to busses 130, 132, 142. SDRAM audio memory 126 may be associated with a connector to which additional memory (e.g., semiconductor, optical, magnetic, etc.) may be connected. Other peripheral devices may also be connected to this connector which constitutes a high-speed parallel connector.

Example Graphics And Audio Processor

Figure 3:
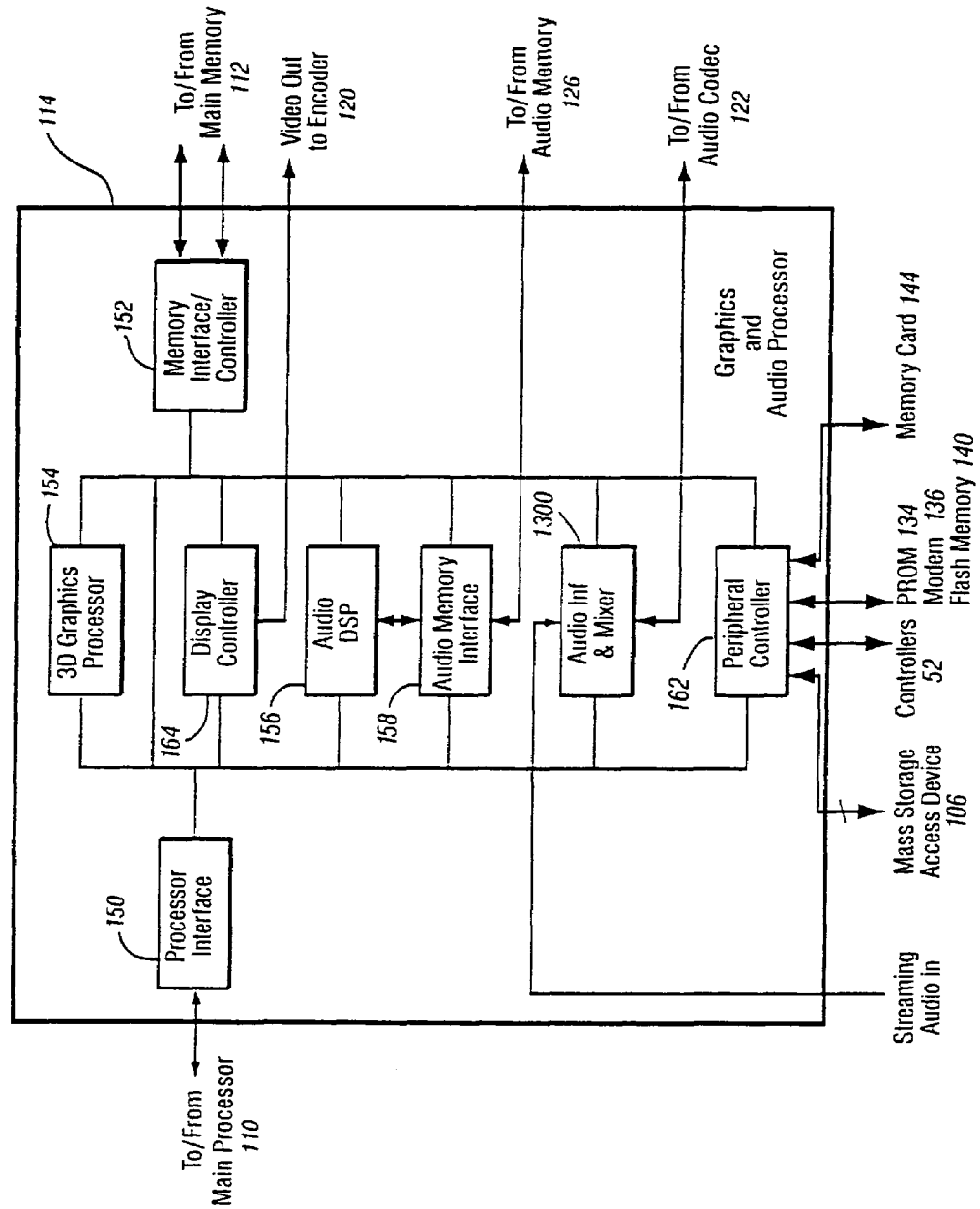
FIG. 3 is a block diagram of the example graphics and audio processor shown in FIG. 2.

FIG. 3 is a block diagram of an example graphics and audio processor 114. Graphics and audio processor 114 in one example may be a single-chip ASIC (application specific integrated circuit). In this example, graphics and audio processor 114 includes:
- a processor interface 150,
- a memory interface/controller 152,
- a 3D graphics processor 154,
- an audio digital signal processor (DSP) 156,
- an SDRAM audio memory interface 158,
- an audio interface and mixer 1300,
- a peripheral controller 162, and
- a display controller 164.

3D graphics processor 154 performs graphics processing tasks. Audio digital signal processor 156 performs audio processing tasks. Display controller 164 accesses image information from main memory 112 and provides it to video encoder 120 for display on display device 56. Audio interface and mixer 1300 interfaces with audio codec 122, and can also mix audio from different sources (e.g., streaming audio from mass storage access device 106, the output of audio DSP 156, and external audio input received via audio codec 122). Processor interface 150 provides a data and control interface between main processor 110 and graphics and audio processor 114.

Memory interface 152 provides a data and control interface between graphics and audio processor 114 and memory 112. In this example, main processor 110 accesses main memory 112 via processor interface 150 and memory interface 152 that are part of graphics and audio processor 114. Peripheral controller 162 provides a data and control interface between graphics and audio processor 114 and various peripheral devices mentioned above. SDRAM audio memory interface 158 provides an interface with SDRAM audio memory 126.

Example Graphics Pipeline

Figure 4:
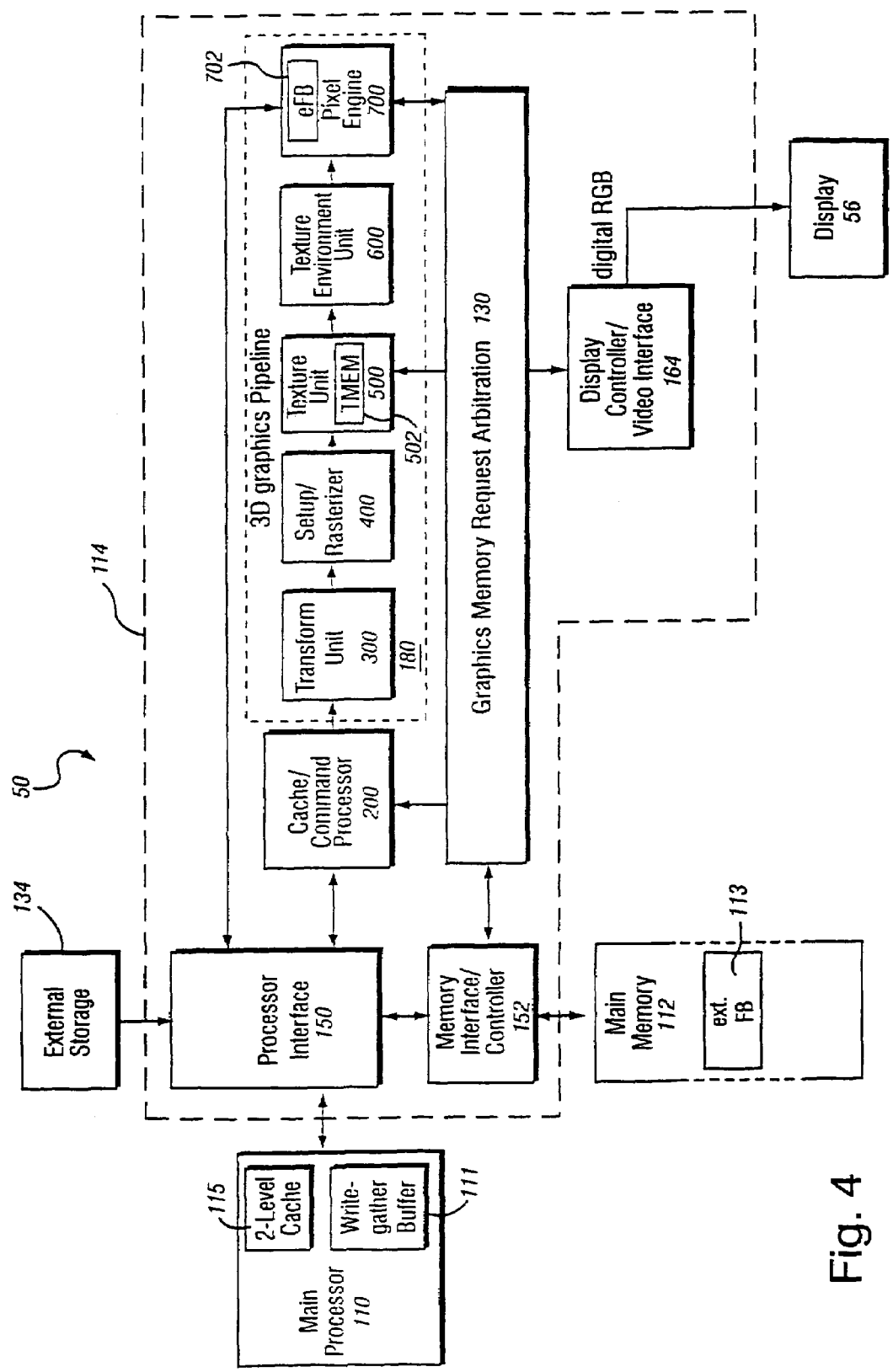
FIG. 4 is a block diagram of the example 3D graphics processor shown in FIG. 3.

FIG. 4 shows a more detailed view of an example 3D graphics processor 154. 3D graphics processor 154 includes, among other things, a command processor 200 and a 3D graphics pipeline 180. Main processor 110 communicates streams of data (e.g., graphics command streams and display lists) to command processor 200. Main processor 110 has a two-level cache 115 to minimize memory latency, and also has a write-gathering buffer 111 for uncached data streams targeted for the graphics and audio processor 114. The write-gathering buffer 111 collects partial cache lines into full cache lines and sends the data out to the graphics and audio processor 114 one cache line at a time for maximum bus usage.

Command processor 200 receives display commands from main processor 110 and parses them—obtaining any additional data necessary to process them from shared memory 112. The command processor 200 provides a stream of vertex commands to graphics pipeline 180 for 2D and/or 3D processing and rendering. Graphics pipeline 180 generates images based on these commands. The resulting image information may be transferred to main memory 112 for access by display controller/video interface unit 164—which displays the frame buffer output of pipeline 180 on display 56.

Figure 5:
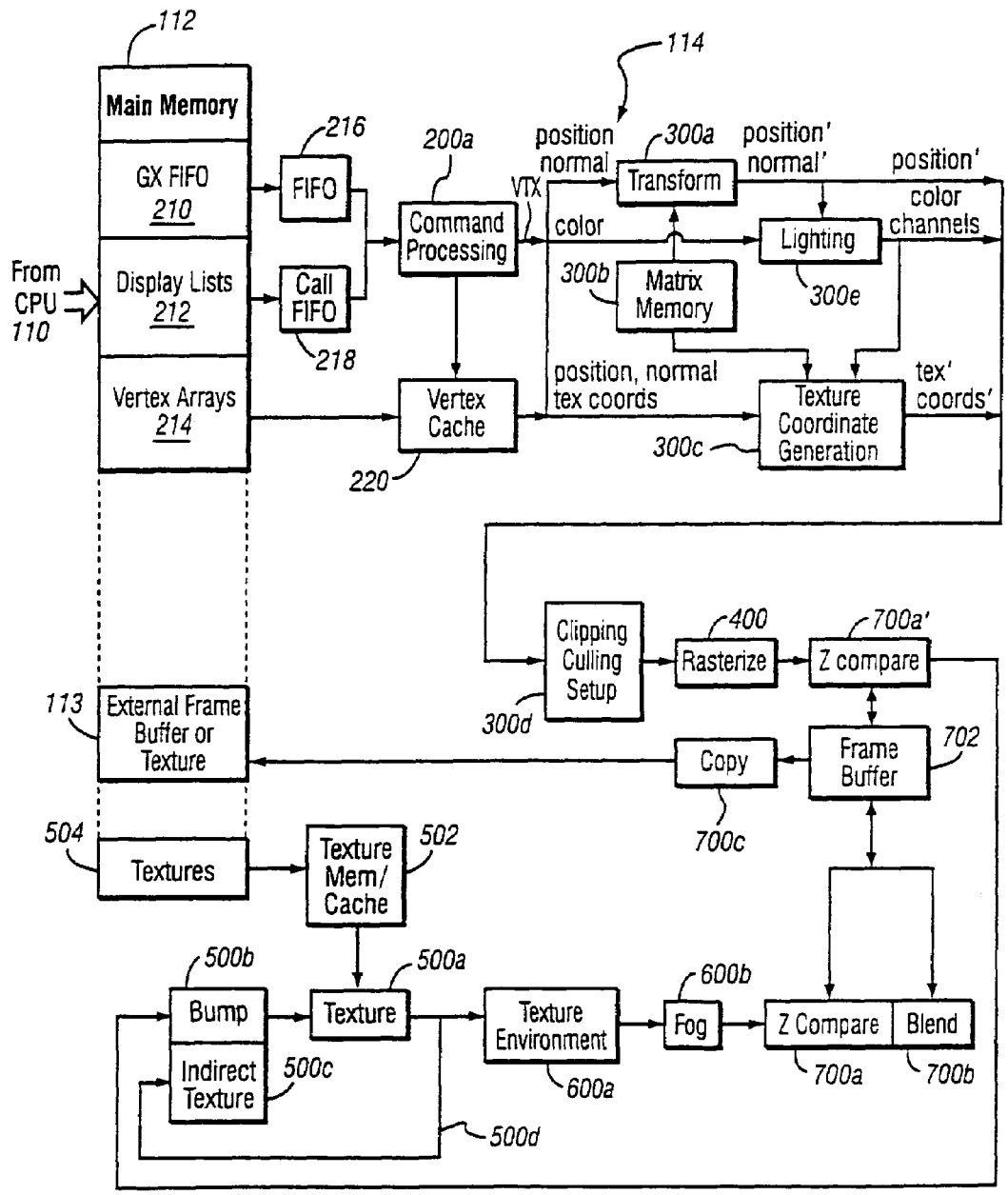
FIG. 5 is an example logical flow diagram of the FIG. 4 graphics and audio processor.

FIG. 5 is a logical flow diagram of graphics processor 154. Main processor 110 may store graphics command streams 210, display lists 212 and vertex arrays 214 in main memory 112, and pass pointers to command processor 200 via bus interface 150. The main processor 110 stores graphics commands in one or more graphics first-in-first-out (FIFO) buffers 210 it allocates in main memory 112. The command processor 200 fetches:

- command streams from main memory 112 via an on-chip FIFO memory buffer 216 that receives and buffers the graphics commands for synchronization/flow control and load balancing,
- display lists 212 from main memory 112 via an on-chip call FIFO memory buffer 218, and
- vertex attributes from the command stream and/or from vertex arrays 214 in main memory 112 via a vertex cache 220.

Command processor 200 performs command processing operations 200a that convert attribute types to floating point format, and pass the resulting complete vertex polygon data to graphics pipeline 180 for rendering/rasterization. A programmable memory arbitration circuitry 130 (see FIG. 4) arbitrates access to shared main memory 112 between graphics pipeline 180, command processor 200 and display controller/video interface unit 164.

FIG. 4 shows that graphics pipeline 180 may include:
- a transform unit 300,
- a setup/rasterizer 400,
- a texture unit 500,
- a texture environment unit 600, and
- a pixel engine 700.

Transform unit 300 performs a variety of 2D and 3D transform and other operations 300a (see FIG. 5). Transform unit 300 may include one or more matrix memories 300b for storing matrices used in transformation processing 300a. Transform unit 300 transforms incoming geometry per vertex from object space to screen space; and transforms incoming texture coordinates and computes projective texture coordinates (300c). Transform unit 300 may also perform polygon clipping/culling 300d. Lighting processing 300e also performed by transform unit 300b provides per vertex lighting computations for up to eight independent lights in one example embodiment. Transform unit 300 can also perform texture coordinate generation (300c) for embossed type bump mapping effects, as well as polygon clipping/culling operations (300d).

Setup/rasterizer 400 includes a setup unit which receives vertex data from transform unit 300 and sends triangle setup information to one or more rasterizer units (400b) performing edge rasterization, texture coordinate rasterization and color rasterization.

Texture unit 500 (which may include an on-chip texture memory (TMEM) 502) performs various tasks related to texturing including for example:
- retrieving textures 504 from main memory 112,
- texture processing (500a) including, for example, multi-texture handling, post-cache texture decompression, texture filtering, embossing, shadows and lighting through the use of projective textures, and BLIT with alpha transparency and depth,
- bump map processing for computing texture coordinate displacements for bump mapping, pseudo texture and texture tiling effects (500b), and
- indirect texture processing (500c).

Texture unit 500 outputs filtered texture values to the texture environment unit 600 for texture environment processing (600a). Texture environment unit 600 blends polygon and texture color/alpha/depth, and can also perform texture fog processing (600b) to achieve inverse range based fog effects. Texture environment unit 600 can provide multiple stages to perform a variety of other interesting environment-related functions based for example on color/alpha modulation, embossing, detail texturing, texture swapping, clamping, and depth blending.

Pixel engine 700 performs depth (z) compare (700a) and pixel blending (700b). In this example, pixel engine 700 stores data into an embedded (on-chip) frame buffer memory 702. Graphics pipeline 180 may include one or more embedded DRAM memories 702 to store frame buffer and/or texture information locally. Z compares 700a' can also be performed at an earlier stage in the graphics pipeline 180 depending on the rendering mode currently in effect (e.g., z compares can be performed earlier if alpha blending is not required). The pixel engine 700 includes a copy operation 700c that periodically writes on-chip frame buffer 702 to memory portion 113 of main memory 112 for access by display/video interface unit 164. This copy operation 700c can also be used to copy embedded frame buffer 702 contents to textures in the main memory 112 for dynamic texture synthesis effects. Anti-aliasing and other filtering can be performed during the copy-out operation. The frame buffer output of graphics pipeline 180 (which is ultimately stored in main memory 112) is read each frame by display/video interface unit 164. Display controller/video interface 164 provides digital RGB pixel values for display on display 56.

Example Input/Output Subsystem

Figure 6:
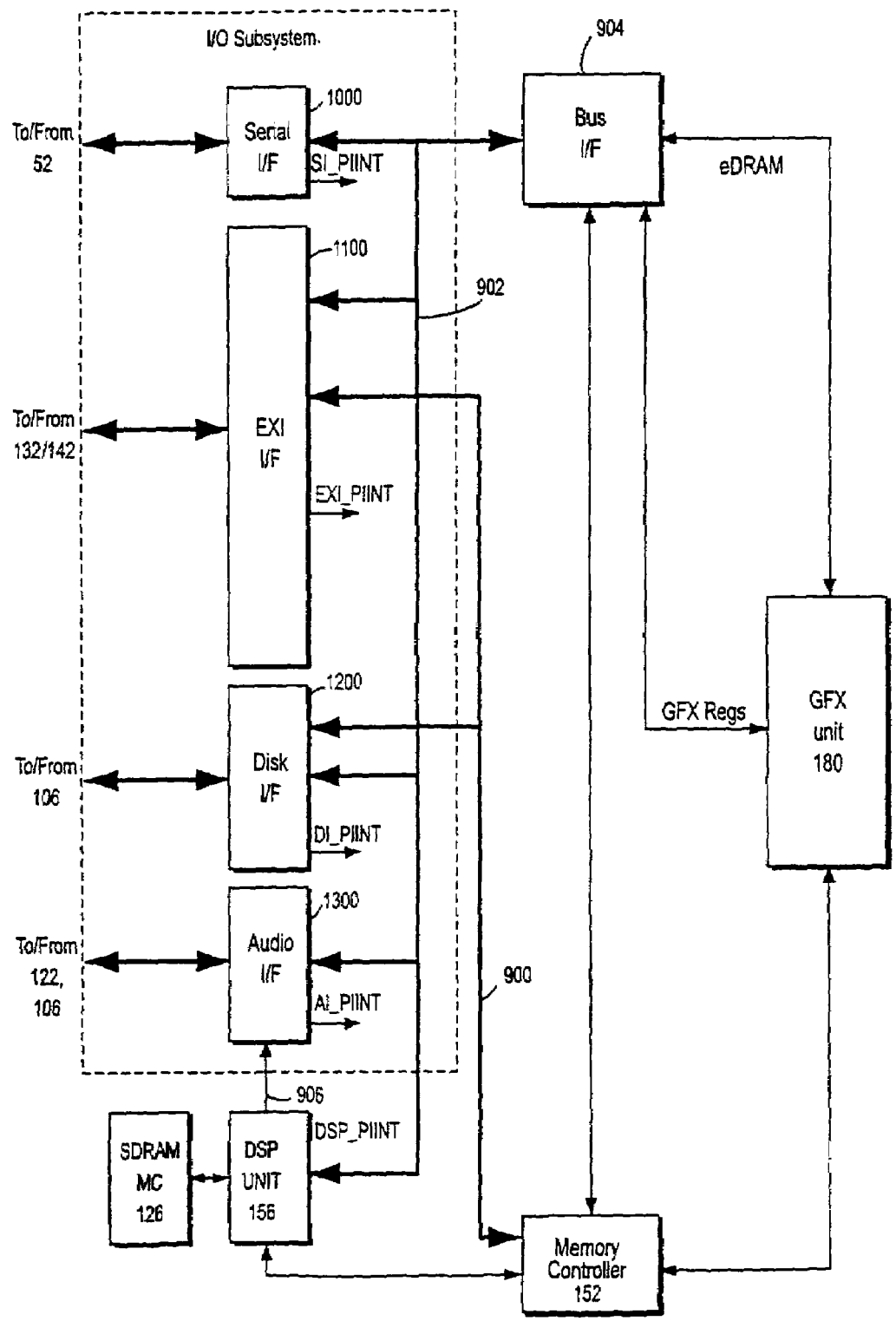
FIG. 6 shows an example input/output subsystem block diagram.

FIG. 6 shows an example input/output subsystem. In this example, the input/output subsystem includes a serial interface 1000, an external interface 1100, a disk interface 1200 and audio interface 1300. Serial interface 1000 is used to communicate with controllers 52 or other devices that can be coupled to one of four serial ports of system 50. External interface 1100 is used to communicate with a variety of devices such as PROM RTC 134, modem 136, flash memory 140, memory card 144, etc. via various SPI buses 132, 142. Disk interface 1200 is used to communicate with mass storage access device 106 via a parallel bus 130. Audio interface 1300 is used to stream the audio output data from an audio buffer in main memory 112 to audio codec 122.

In the example embodiment, the external interface 1100 and disk interface 1200 have direct access to memory controller 152 via a bus 900. In addition, each one of interfaces 1000, 1100, 1200 and 1300 as well as audio digital signal processor 156 share a common bus 902 used to communicate between these components and a bus interface 904. The bus interface 904, in turn, can be used to arbitrate access to graphics unit 180 including embedded DRAM 702. In the example embodiment, there is also a connection 906 between DSP 156 and audio interface 1300.

Briefly, disk interface 1200 provides an interface to mass storage access device 106 providing a direct memory access capability with interrupt. Serial interface 1000 provides a serial interface to hand controllers 52 or other serial devices using automatic controller polling and bulk data mode including a light gun interface. The external interface 1100 provides multiple serial peripheral interface (SPI) buses as well as a memory mapped area for boot PROM 134. Audio interface 1300 provides an output to audio codec 122 as well as an input for streaming audio from mass storage access device 106. These various interfaces 1000, 1100, 1200, 1300 provide a shared memory port for direct memory access, with round robin arbitration for access to main memory.

Example Detailed Overall System Embodiment/Implementation

Figure 7:
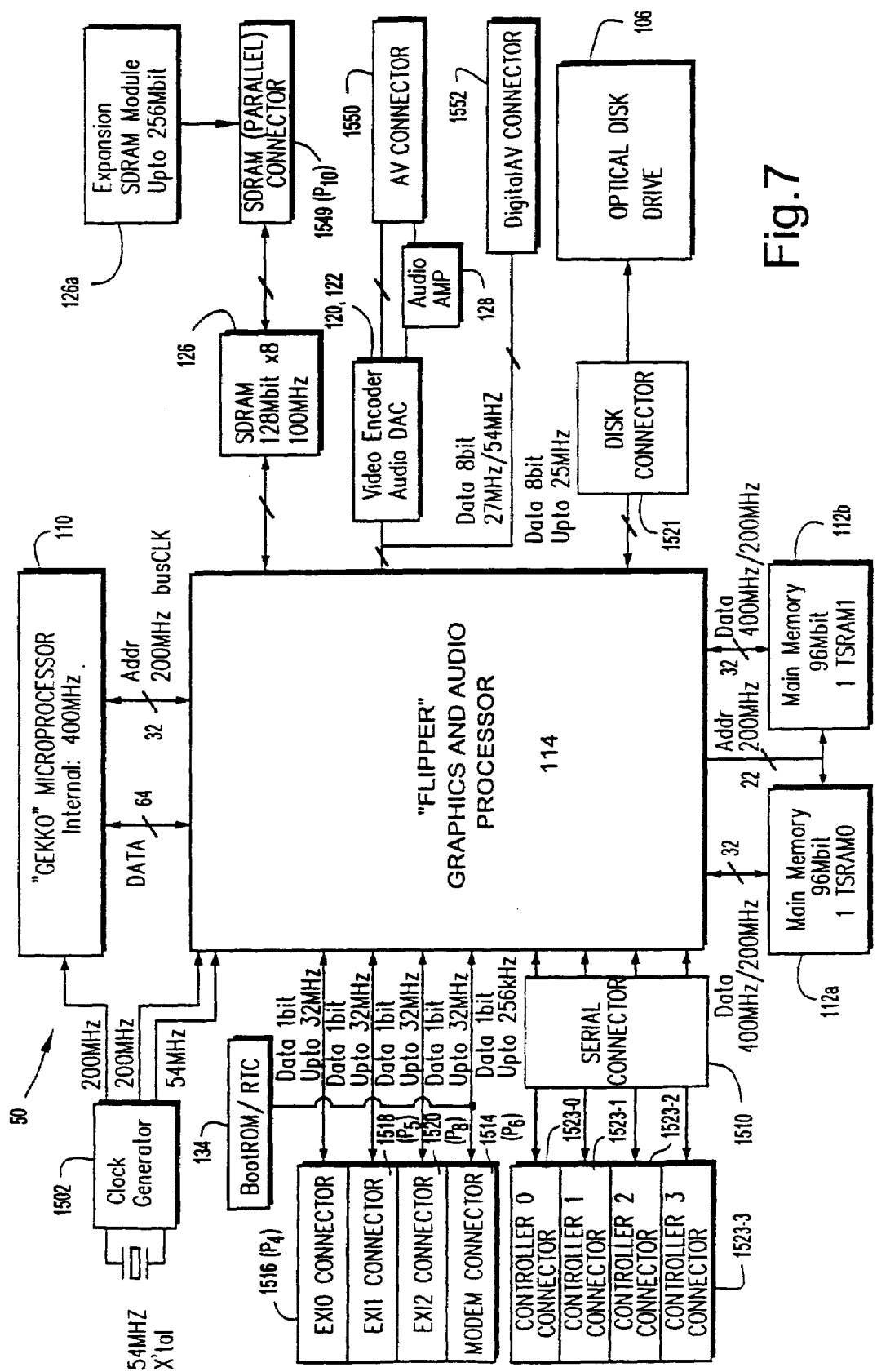
FIG. 7 is a block diagram of an example overall more detailed embodiment of an example video game system.

FIG. 7 shows an example, detailed embodiment/implementation of system 50 shown in FIG. 2. In this example implementation:

- A clock generator 1502 provides clocking signals to both main microprocessor 110 and to graphics and audio processor 114.
- A 32-bit address bus and a 64-bit data bus connect the graphics and audio processor 114 with the main microprocessor 110.
- Main memory 112 is implemented as a pair of 96-megabit, 1TSRAM chips manufactured by MOSYS, Inc.
- A multi-pin modem connector 1514 (P6) is used to connect the graphics and audio processor 114 to an external or internal modem.
- The boot ROM/real time clock 134 is coupled to the modem connector 1514 (P6) and shares its bus for communication with the graphics and audio processor 114.
- Three multi-pin EXI connectors 1516 (P4), 1518 (P5), 1520 (P8) are used to connect the graphics and audio processor 114 to various internal and/or external peripheral or other devices.
- A multi-pin serial connector 1510 is used to couple the graphics and audio processor 114 to four controller connectors 1523-0, 1523-1, 1523-2, 1523-3 each of which is connected to a different hand controller 52 or other external input/output device.
- A multi-pin disk interface connector 1521 is used to couple the graphics and audio processor 114 to the optical disk drive 106.
- The SDRAM 126 may be provided with a multi-pin expansion (high-speed parallel) connector 1549 (P10) that can be used to expand the 128 MB capacity of SDRAM 126 with an additional SDRAM expansion module 126a or connect to other peripheral devices such as a hard disk drive.
- An analog audio/video connector 1550 having multiple pins communicates analog audio and video information between the graphics and audio processor 114 and external devices such as, for example, television sets, external display monitors, external loudspeakers or other input/output devices.
- A digital audio/video connector 1552 having multiple pins makes the digital and audio interface provided by graphics and audio processor 114 available to the outside world for connection to any of a variety of different digital video and/or audio devices.

In one example implementation, the following external connectors may be provided:

- four game controller connectors (1523-0, 1523-1, 1523-2, 1523-3);
- two memory card slots (51, 52) associated with connectors 1516 (P4) and 1518 (P5);
- one analog audio/video connector (1550);
- one digital audio/video connector (1552);
- two high speed serial connectors (1514 (P6) and 1520 (P8)); and
- one high speed parallel connector (1549 (P10)).

In the example shown, each of connectors 1510, 1514, 1516, 1518, 1520, 1521, 1523-0-1523-3, 1549, 1550 and 1552 comprises a mating male and female multi-pin connector that allows connections to be made, broken and remade without destructive or permanent processes such as soldering or permanent (non-deformable) crimping. Use of such connectors allows simple and easy connection and disconnection between different modular portions of system 50 to provide an easy-to-manufacture system that can also be expanded, extended and reconfigured in the field without special equipment and involved processes.

Figure 8:
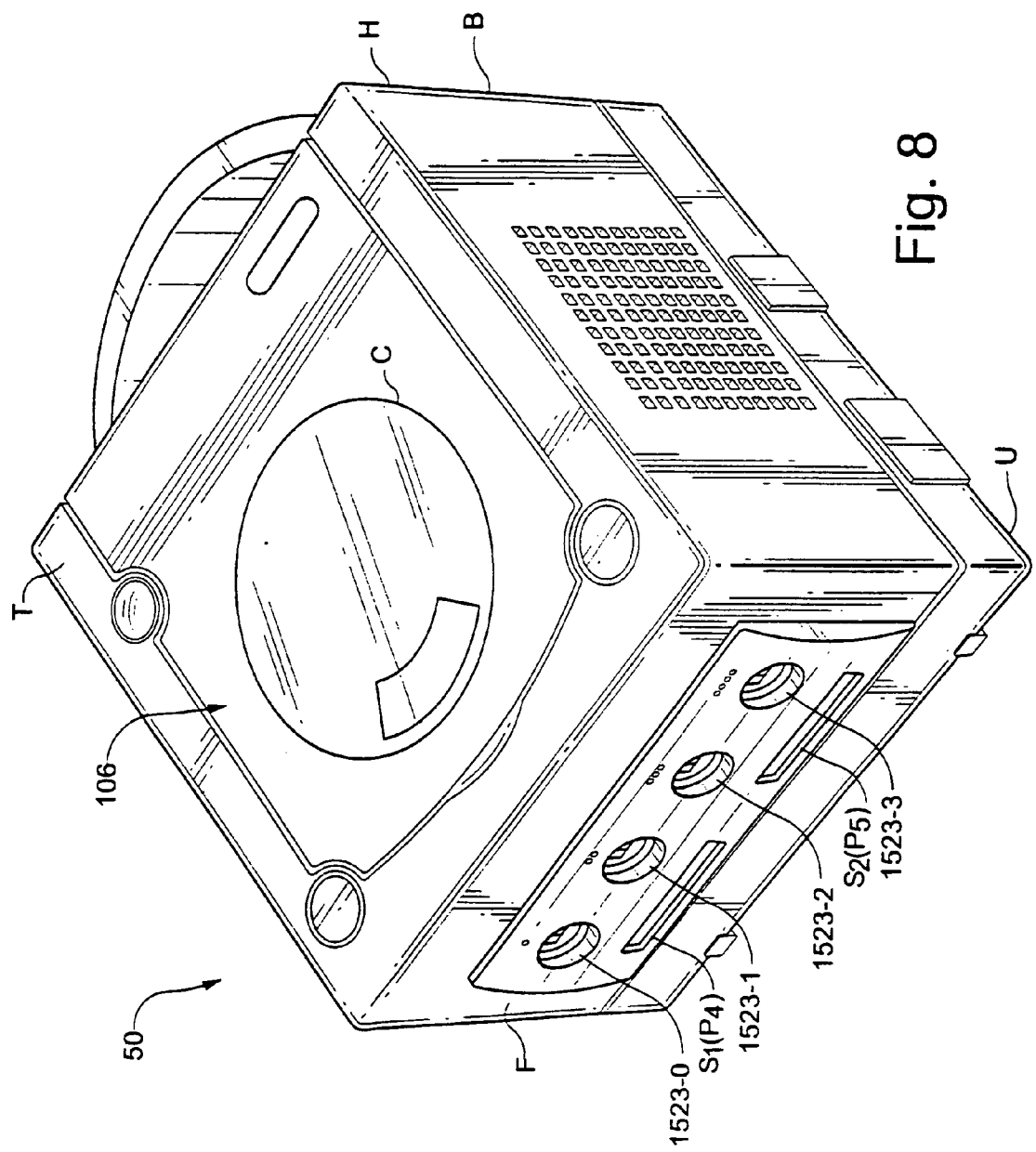
FIGS. 8–14B show external views of an example video game system showing example external connector configurations.
Figure 9:
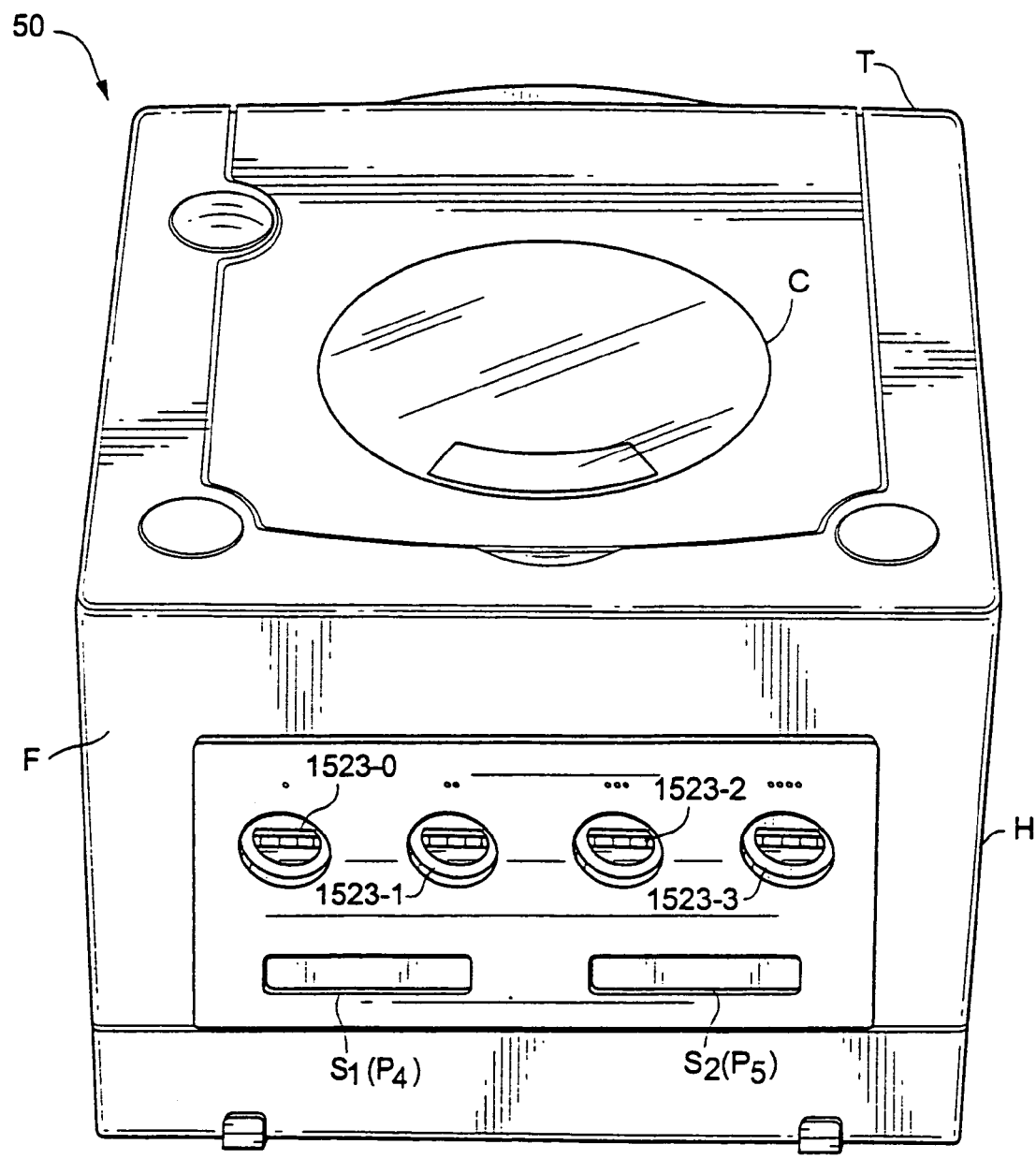
Figure 10:
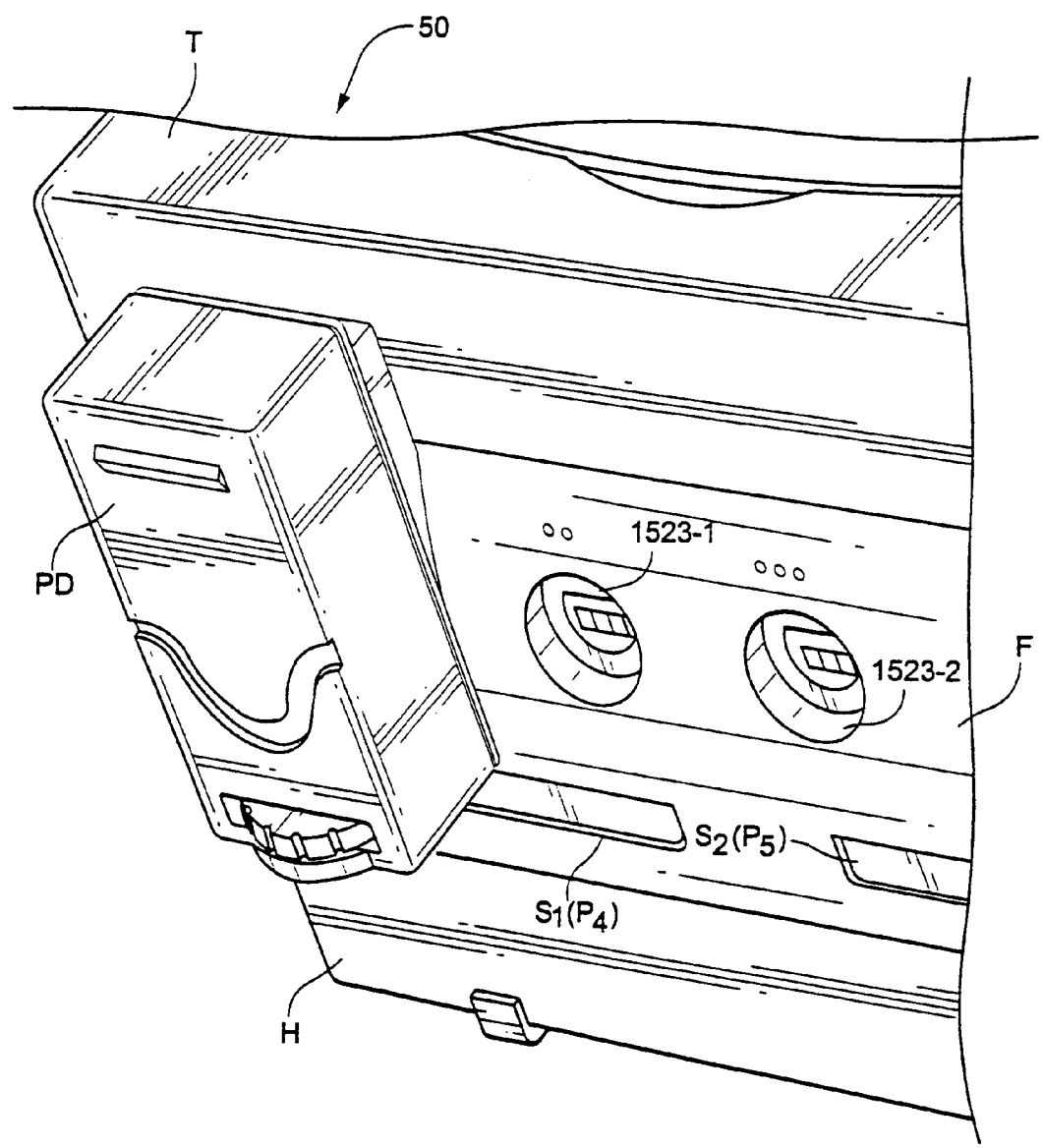

FIGS. 8–14B show an example external view of system 50 within a housing H. Referring specifically to FIG. 8, housing H includes a front side F, a back side B, a top surface T and a bottom surface U. Disk drive 106 may be housed beneath a hinged, openable access cover C that allows the user to insert optical disks 62 into housing H. Controller connectors 1523-0, 1523-1, 1523-2, 1523-3 may be disposed on front surface F (as best shown in FIG. 9). Example connectors 1523 may each comprise a 10-pin female connector configured to accept a mating 10-pin male connector of appropriate configuration. Such a connector may, for example, couple system 50 to a wire-connected handheld controller 52, a light gun, or any other peripheral device. FIG. 10 shows an example peripheral device PD (in this case a receiver (e.g., an infrared or radio frequency receiver) for a wireless handheld controller 52—but it could be any sort of device) connected to connector 1523a and being supported by the connector configuration.

Figure 11:
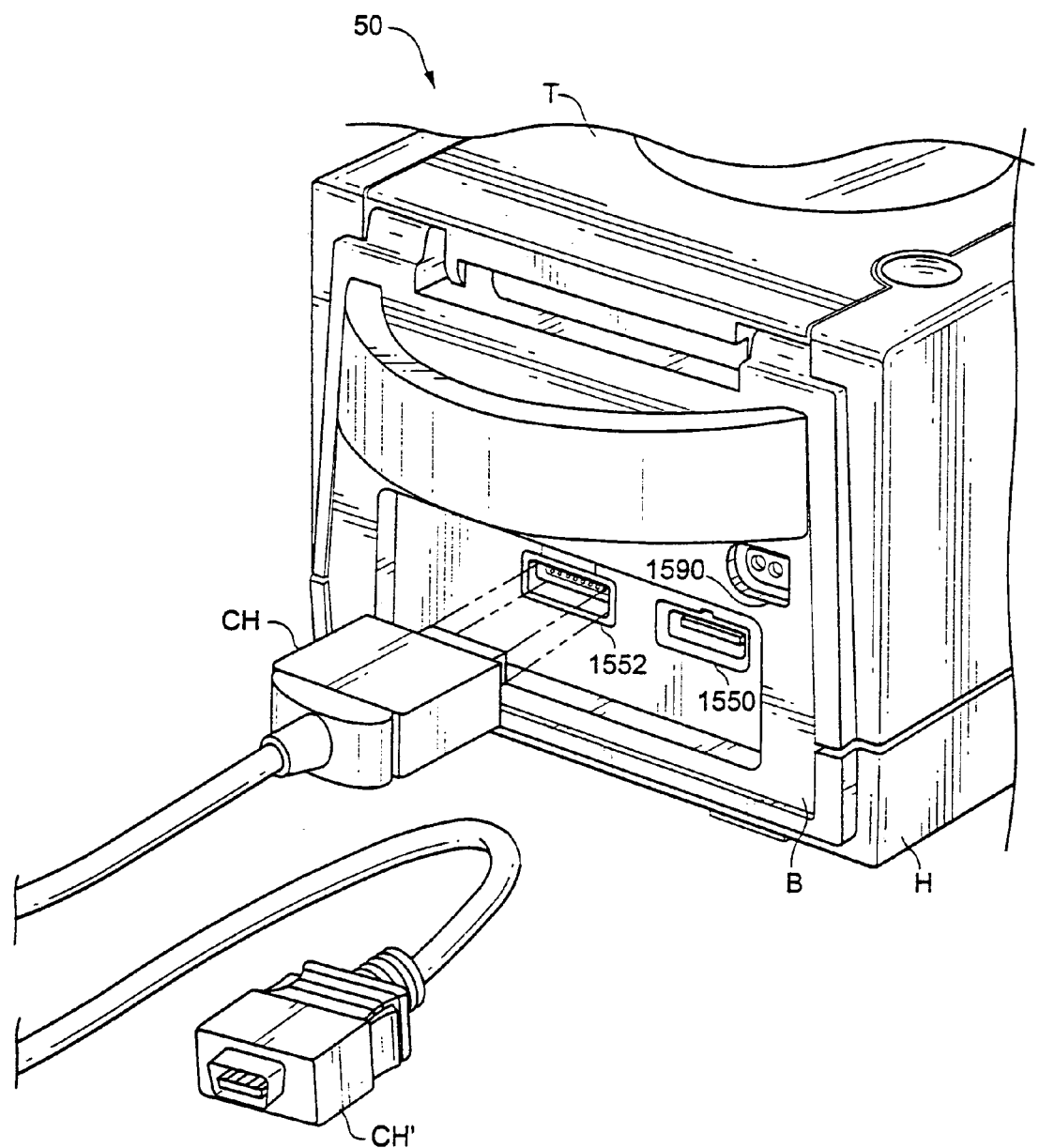

Referring now more particularly to FIG. 11, a digital audio/video connector 1552 and an analog audio/video connector 1550 may be disposed on rear surface B of housing H. Each of these connectors 1550, 1552 can output sound and picture signals. However, the digital connector 1552 provides access to the internal video and audio buses described above—thereby providing additional flexibility in terms of interfacing system 50 with sophisticated digital audio and/or video equipment. A connector CH of an appropriate configuration can be connected to the digital connector 1552, and the other end CH' of such a connector/cable can be connected to any sort of compatible external equipment. Similarly, a connector (not shown) can be coupled to the analog audio/video connector 1550 to provide analog audio and video information to a home television set, display monitor or other such equipment. A two-pin power supply connector 1590 may also be provided on rear panel B for inputting DC power to system 50. For example, an external 12 volt DC power supply can provide 12 volts DC to connector 1590, and internal voltage regulation circuitry can regulate this 12 volt DC power supply level down to appropriate lower intermediate voltage levels.

Figure 12:
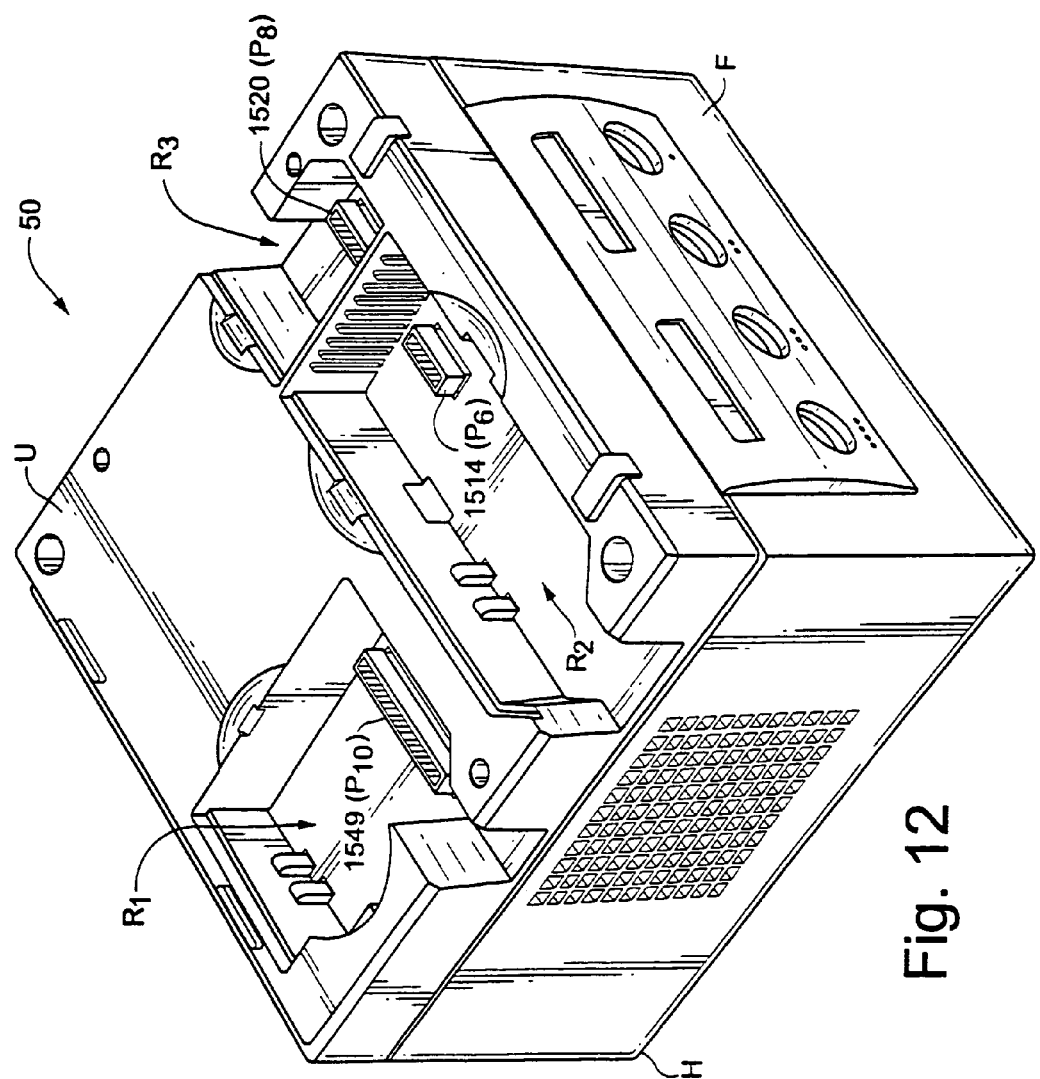
Figure 13:
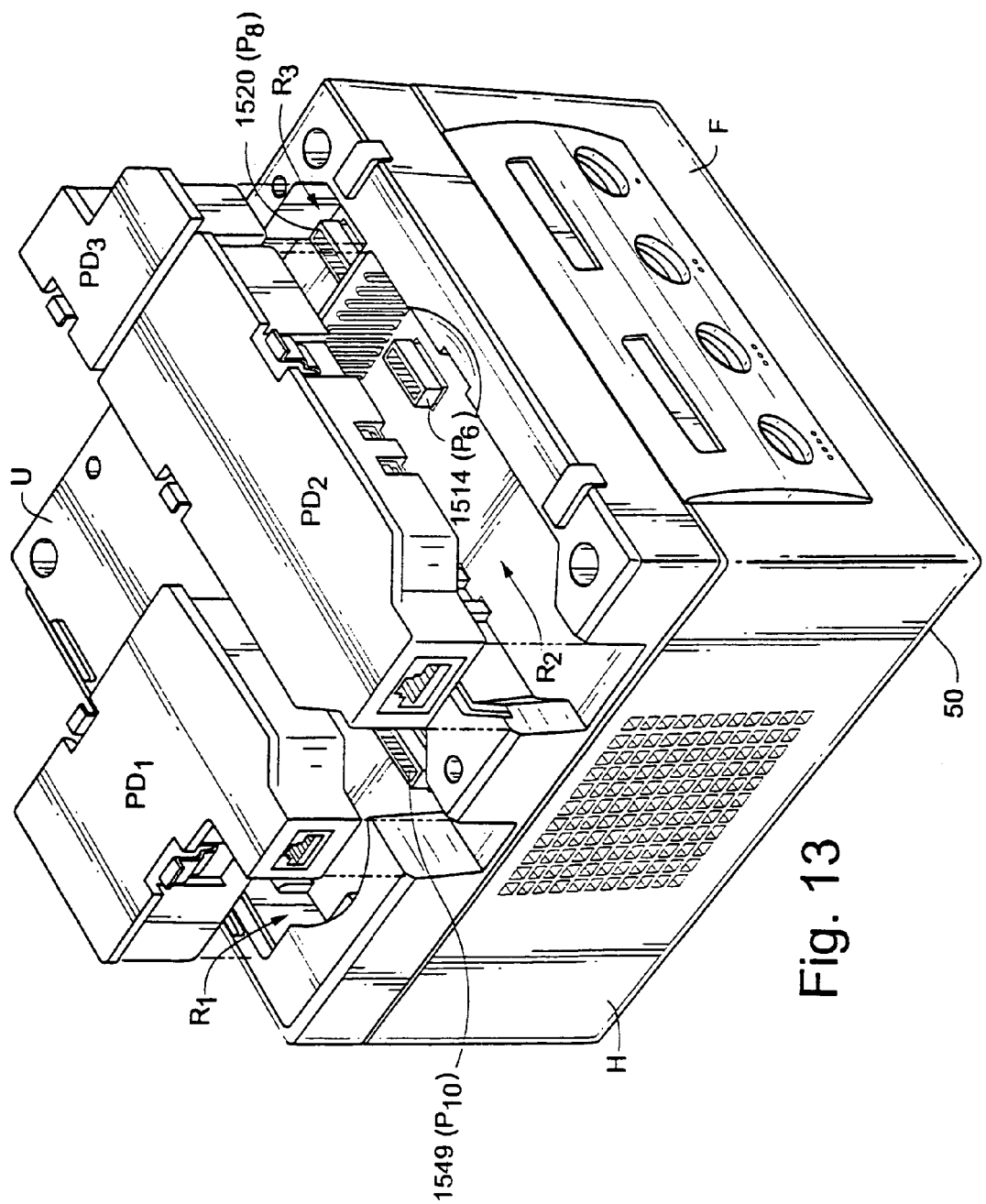
Figure 14B:
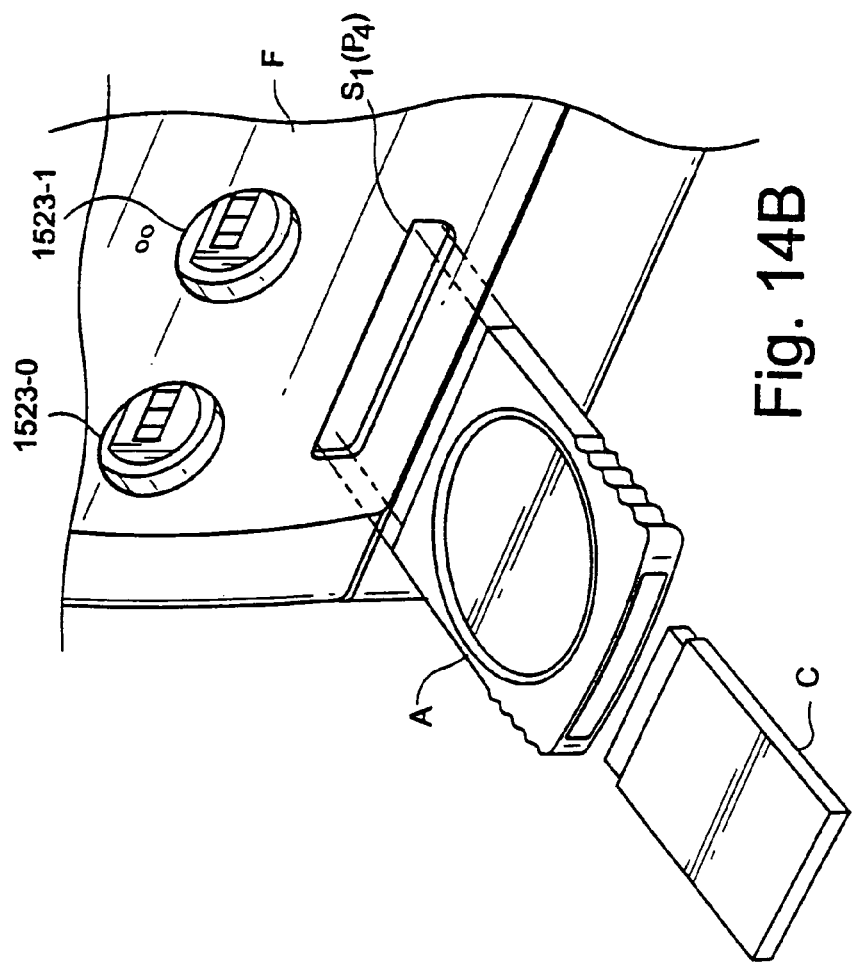
Figure 14A:
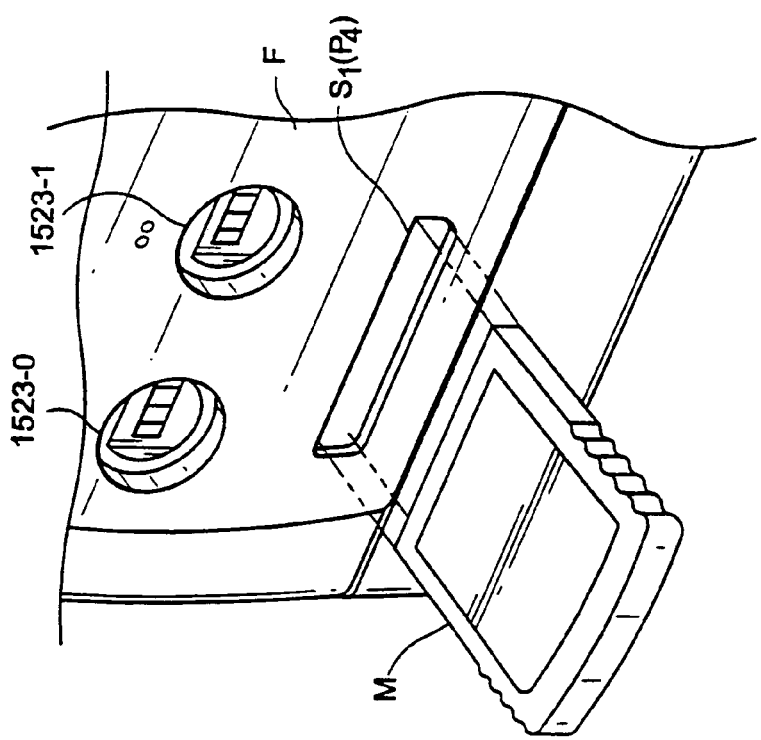

Referring to FIG. 12, the bottom surface U of housing H may include a number of recesses normally covered by covers (not shown). Removal of such covers exposes recesses and associated connectors. For example, a recess $R_1$ may include a "high speed port" connector such as the connector 1549 (P10) and a recess $R_2$ may expose and provide connection to a modem connector 1514 (P6). Further recess $R_3$ may expose and provide connection to an additional serial port such as the connector 1520 (P8). As best seen in FIG. 13, peripheral devices PD1, PD2 and PD3 can be mechanically configured to fit dimensionally within corresponding recess $R_1$, $R_2$, $R_3$ so that such peripheral devices can be mounted flush within the generally cubic configuration of housing H. In this way, the footprint of the video game system can remain the same, even if peripheral devices PD1, PD2 and PD3 are added. Such peripheral devices PD1, PD2, PD3 may include a broadband adapter, a modem, or any other sort of electronic or electrical device providing data inputs and/or outputs. Devices PD1, PD2 and PD3 can be modular and inserted or removed into corresponding recess R at will to provide different expansion or other functionality for system 50. Of course, a connecting cable or wireless communications device could be coupled to any of the connectors 1514 (P6), 1520 (P8) and 1549 (P10) to allow system 50 to be interconnected with a free-standing external system or device such as an external magnetic or optical disk drive. The example connectors of the video game system preferably (although not necessarily) provide power so that devices PD1, PD2 and PD3 need not provide their own power sources.

FIG. 13 shows that the peripheral devices may include additional connectors for connections other than connections to the video game system. For example, if peripheral device PD2 is a modem, it will include a connector for connecting the modem to connector 1514 (P6) and an additional connector for connecting the modem to a telephone line. The recesses $R_1$, $R_2$, $R_3$ are formed so that these additional connectors are easily accessible when the peripheral devices are inserted therein. In the FIG. 13 example embodiment, each recess includes a cut-out portion (opening) formed through one of the sidewalls of housing H. The peripheral device is configured so that any additional connector thereof is accessible via this cut-out portion when the peripheral device is inserted into a recess.

As mentioned above, peripheral devices PD1, PD2 and PD3 may be any type of peripheral device for coupling to a home video game system. The particular elements making up a peripheral device will depend upon its functionality. Generally speaking, the peripheral device includes one or more electrical components and an electrical connector coupled to the electrical component(s) for connecting to one of the game system connectors. For example, a game controller typically includes user manipulable controls (such as buttons, joysticks, crosspads and the like) and an electrical connector that couples electrical signals based on inputs to the user manipulable controls to one of connectors 1523. Of course, the game controller may include other components such as a memory for storing game data; processing circuitry such as a microprocessor, an application specific integrated circuit, a microcontroller, and the like; and a motor for vibrating the housing of the controller in accordance with commands received from the home video game system. Other peripheral devices may include communication circuits for communicating via wired or wireless communication networks; memory devices including optical, magnetic and semiconductor memories; display devices such as liquid crystal displays; printers; optical detectors such as digital cameras; computers; keypads; keyboards; pointing devices; voice recognition systems; etc.

Referring to FIGS. 9, 10 and 14A–14B, additional slots S on front panel F provide access to connectors 1516 (P4) and 1518 (P5). Slots S may be used to insert portable memory devices such as flash memory for example. A "digicard" memory device M shown in FIG. 14A may include 4 megabits (or 1 half megabit) of flash memory and fits snugly into slot $S_1$ underneath the controller port holes 1523-0, 1523-1 mounted on front panel F. System 50 also supports SD-digicard adapter A shown in FIG. 14B that is compatible with stamp-sized, large capacity recording media, SD-memory cards C made by Matsushita. Such SD cards C may offer 64 megabits or more of non-volatile storage. The memory cards may be used to store game-related data. Other cartridge-based memory cards or other devices may also be received by slots $S_1$, $S_2$ to interconnect system 50 with other types of internal or external peripheral or other devices.

Any of the various connectors described herein can be located in the various connector positions shown in FIGS. 8–14B as desired and it will be appreciated that the invention is not limited in this respect.

While the invention has been described in connection with what is presently considered to be the most practical and preferred embodiment, it is to be understood that the invention is not to be limited to the disclosed embodiment, but on the contrary, is intended to cover various modifications and equivalent arrangements.

What is claimed is:

1. A peripheral device for connection to a home video game system having a generally cube-shaped appearance and comprising an upper portion which receives a storage medium, at least one side portion to which input devices are connectable, and a bottom portion which contacts an underlying support surface, the bottom portion having a recess formed therein, the peripheral device comprising:

an electrical component;

a connector electrically coupled to the electrical component for connecting to a connector of the home video game system disposed in the recess;

a housing containing the electrical component, wherein the housing is configured so that, when the peripheral device is inserted into the recess and the connector connects to the home video game system connector disposed in the recess, an outer surface of the housing is substantially flush with the bottom portion of the home video game system, whereby the generally cubed-shaped appearance of the home video game system remains substantially the same when the peripheral device is inserted into the recess.

2. The peripheral device according to claim 1, further comprising:

an additional connector electrically coupled to the electrical component, the peripheral device being configured so that, when the peripheral device is inserted into the recess and the connector connects to the home video game system connector disposed in the recess, the additional electrical connector is externally accessible via a cut-out portion formed in a side portion of the home video game system.

3. The peripheral device according to claim 1, wherein the electrical component comprises communication circuitry.

4. The peripheral device according to claim 3, wherein the communication circuitry comprises a modem.

5. The peripheral device according to claim 3, wherein the communication circuitry comprises broadband communication circuitry.

6. The peripheral device according to claim 3, wherein the communication circuitry comprises wireless communication circuitry.

7. The peripheral device according to claim 1, wherein the electrical component comprises expansion memory.

8. The peripheral device according to claim 1, wherein the electrical component comprises a hard disk drive.

9. The peripheral device according to claim 1, wherein the connector is adapted for connection to a connector for a parallel interface of the home video game system.

10. The peripheral device according to claim 1, wherein the connector is adapted for connection to a connector for a serial interface of the home video game system.

* * * * *